US011372955B2

(12) United States Patent
Jaber et al.

(10) Patent No.: US 11,372,955 B2
(45) Date of Patent: Jun. 28, 2022

(54) SYSTEM AND METHOD FOR AUTHORIZING TEMPORARY DATA ACCESS TO A VIRTUAL ASSISTANT

(71) Applicant: MICROSOFT TECHNOLOGY LICENSING, LLC, Redmond, WA (US)

(72) Inventors: Rayyan Jaber, Seattle, WA (US); Edmundo Ernesto Badillo Fernandez, Seattle, WA (US); Guangcai Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 16/421,388

(22) Filed: May 23, 2019

(65) Prior Publication Data

US 2020/0372140 A1    Nov. 26, 2020

(51) Int. Cl.
| | |
|---|---|
| *G06F 21/31* | (2013.01) |
| *G10L 15/22* | (2006.01) |
| *H04L 12/18* | (2006.01) |
| *H04N 7/15* | (2006.01) |

(52) U.S. Cl.
CPC .............. *G06F 21/31* (2013.01); *G10L 15/22* (2013.01); *H04L 12/1822* (2013.01); *H04N 7/15* (2013.01); *G10L 2015/223* (2013.01)

(58) Field of Classification Search
CPC ... G06F 21/31; G10L 15/22; G10L 2015/223; H04L 12/1822; H04N 7/15
See application file for complete search history.

(56) References Cited

U.S. PATENT DOCUMENTS

| | | | |
|---|---|---|---|
| 7,107,312 | B2 | 9/2006 | Hackbarth et al. |
| 2011/0090822 | A1* | 4/2011 | Lee .................. H04M 3/56 370/260 |
| 2013/0325704 | A1 | 12/2013 | Gorman et al. |
| 2014/0149160 | A1 | 5/2014 | Argue et al. |
| 2014/0278343 | A1 | 9/2014 | Tran |

(Continued)

FOREIGN PATENT DOCUMENTS

| | | |
|---|---|---|
| WO | 2017182888 A2 | 10/2017 |
| WO | 2018004935 A1 | 1/2018 |

OTHER PUBLICATIONS

"International Search Report and Written Opinion Issued in PCT Application No. PCT/US20/031401", dated Aug. 6, 2020, 11 Pages.

(Continued)

*Primary Examiner* — Phuong H Nguyen
(74) *Attorney, Agent, or Firm* — NovoTechIP International PLLC

(57) ABSTRACT

Methods and systems for authorizing and enabling a virtual assistant or meeting host temporary access to one's own data during an activity or meeting event. A user is offered various options for enabling the temporary access to the virtual assistant prior to a scheduled meeting, and during impromptu meetings. The user can specify the duration that the access should be valid, a system can automatically disable the temporary access at the termination of the meeting event and/or if the user is no longer a participant at the meeting event. The authorization can be configured to target specific types of data and types of access.

20 Claims, 26 Drawing Sheets

(56) References Cited

U.S. PATENT DOCUMENTS

| | | | |
|---|---|---|---|
| 2014/0337080 A1* | 11/2014 | Jackson | G06Q 10/1095 |
| | | | 705/7.19 |
| 2016/0012240 A1 | 1/2016 | Smith et al. | |
| 2017/0288943 A1 | 10/2017 | Plumb et al. | |
| 2018/0007060 A1* | 1/2018 | Leblang | H04W 12/06 |
| 2018/0103074 A1 | 4/2018 | Rosenberg | |
| 2019/0108834 A1* | 4/2019 | Nelson | G10L 15/1815 |

OTHER PUBLICATIONS

Alba, Davey,"The Ai Bot That Scans Your Email and Automatically Schedules Meetings", Retrieved from: https://www.wired.com/2015/01/virtual-email-assistant/, Jan. 12, 2015, pp. 1-9.

* cited by examiner

SYSTEM AND METHOD FOR AUTHORIZING TEMPORARY DATA ACCESS TO A VIRTUAL ASSISTANT

BACKGROUND

There are a number of conference tools presently available for enabling people to conduct live meetings, conferences, presentations, or other types of gatherings via the Internet, the public switched telephone network (PSTN), or other voice and/or data networks. In these cases, participants typically use a telephone, computer, or other communication device that connects to a conference system or server. The meetings include an audio component and/or a visual component, such as, a shared presentation, video, whiteboard, or other multimedia, text, graphics, etc. These types of convenient conference solutions have become an indispensable form of communication for many businesses and individuals.

Typically, such meeting events involve an organizer initially scheduling a meeting and sending meeting invitations to the desired participants. Each invited participant can be provided a subject of the meeting, a location for the meeting and/or a call-in telephone number, a time and date for the meeting, an access code in the form of a pass code and, perhaps, a list of other participants. An invited participant can then join other meeting participants at the pre-designated location or connect to the scheduled meeting via a conference call.

However, while existing conference, meeting, grouping or other types of gathering systems offer many benefits, there remain significant areas for new and improved ideas for allowing users to easily and efficiently access their data during the meeting and easily share selected documents with their fellow meeting participants.

SUMMARY

A system, in accord with a first aspect of this disclosure, includes a processor and machine-readable media including instructions which, when executed by the processor, cause the processor to receive from a first participant of a first meeting session, at a user authentication service, a first user authorization input for providing temporary session-limited access during the first meeting session to a first data set that the first participant is authorized to access. The instructions also cause the processor to receive from the first participant, at the user authentication service, a first credential authenticating an identity of the first participant, and receive, at the user authentication service, a first notification that the first participant is actively participating in the first meeting session. In addition, the instructions cause the processor to enable, in response to receiving the first notification and the receipt of the first credential, a temporary session-limited access to the first data set limited to a duration of the first meeting session, and receive, during the duration of the first meeting session and after the first notification, a first spoken command from a second participant of the first meeting session requesting rendering of a first electronic content item included in the first data set. Furthermore, the instructions cause the processor to render the first electronic content item to the second participant in response to the first spoken command and a determination that the temporary session-limited access to the first data set remains enabled.

A system, in accord with a second aspect of this disclosure, includes means for receiving from a first participant of a first meeting session, at a user authentication service, a first user authorization input for providing temporary session-limited access during the first meeting session to a first data set that the first participant is authorized to access, as well as means for receiving from the first participant, at the user authentication service, a first credential authenticating an identity of the first participant. The system further includes means for receiving, at the user authentication service, a first notification that the first participant is actively participating in the first meeting session, and means for enabling, in response to receiving the first notification and the receipt of the first credential, a temporary session-limited access to the first data set limited to a duration of the first meeting session. Furthermore, the system includes means for receiving, during the duration of the first meeting session and after the first notification, a first spoken command from a second participant of the first meeting session requesting rendering of a first electronic content item included in the first data set, and means for rendering the first electronic content item to the second participant in response to the first spoken command and a determination that the temporary session-limited access to the first data set remains enabled.

A method, in accord with a third aspect of this disclosure, includes receiving from a first participant of a first meeting session, at a user authentication service, a first user authorization input for providing temporary session-limited access during the first meeting session to a first data set that the first participant is authorized to access. The method also includes receiving from the first participant, at the user authentication service, a first credential authenticating an identity of the first participant, and receiving, at the user authentication service, a first notification that the first participant is actively participating in the first meeting session. In addition, the method includes enabling, in response to receiving the first notification and the receipt of the first credential, a temporary session-limited access to the first data set limited to a duration of the first meeting session, and receiving, during the duration of the first meeting session and after the first notification, a first spoken command from a second participant of the first meeting session requesting rendering of a first electronic content item included in the first data set. Furthermore, the method includes rendering the first electronic content item to the second participant in response to the first spoken command and a determination that the temporary session-limited access to the first data set remains enabled.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
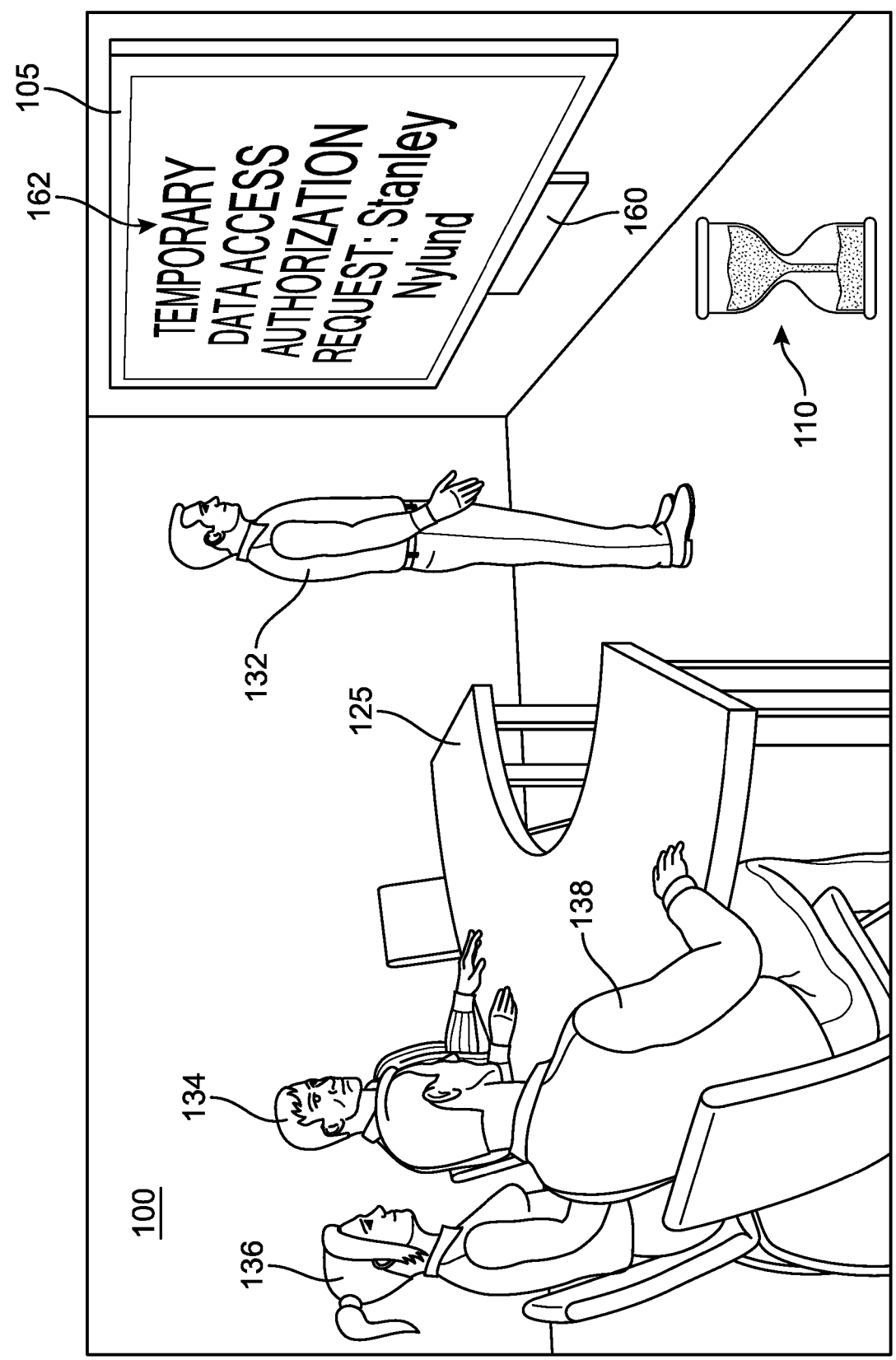
FIGS. 1A-1C are an implementation of a system with which a group of participants in a meeting can request data from a virtual assistant during the meeting session.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following implementations introduce a method and system for permitting a virtual assistant to temporarily access a user's data during a meeting event. Currently, a user may be able to access and share electronic content items during a meeting as long as such data originates from their own personal devices or accounts. In other words, users must bring their own computing devices to a meeting and/or log into another device or application and manually locate their data and connect their device to the meeting room's telecommunications system in order to present such content to other users in the meeting. However, users on many occasions may not carry their computing devices with them to their meetings, the required devices or systems may not be available at the meeting site, the technical resources of the room may not be conducive to the sharing of electronic content from an individual device, and the sharing of data by multiple participants can be hampered as each user attempts to log-in to the meeting device and then must log out to allow another user to subsequently share an electronic content item. As will be discussed below, the disclosed implementations offer a powerful set of technical solutions by which a user can ensure a timely and ready temporary authorization to the meeting's virtual assistant in accessing the user's own stored data. This authorization is granted to the virtual assistant for a limited duration, and allows one or more users to make some or all portions of the users' data accessible and readily share-able. The option will be provided to the user in a manner that maximizes convenience and efficiency. For example, the option to grant temporary data access to the virtual assistant during a meeting can be presented to a user as he or she is scheduling the meeting, during their review of a meeting invitation, and/or while viewing reminders, calendar updates or previews, or other items associated with meeting preparation, information, or notifications. The option can also be offered and/or reconfirmed during the time leading up to and even during the meeting. By offering users the option to grant the virtual assistant a limited access to their data during one or more workflow instances leading up to the meeting and/or during the meeting, a user can enjoy a more dynamic and simplified process by which to share their own content with their colleagues and fellow participants. Furthermore, by providing multiple event opportunities to select the temporary access feature, a user can customize the manner in which such access occurs, per their preferences, and make changes at any stage leading up to, and during, the meeting. For example, a user may authorize temporary access during some meetings, and decline such access to other meetings. In addition, the access type settings or configuration may be adjusted for each meeting event that occurs.

As a general matter, a meeting event ("meeting") or a conference can refer to a real time communication session (which may be referred to as a "meeting session") involving two or more participants (who may be referred to as "meeting session participants," "meeting participants," or "users"). Thus, a meeting can encompass an event, activity, gathering, assembly, class, conference, convention, summit, get-together, congregation, reunion, or the like that may be prescheduled, as well as sessions that occur in a more ad-hoc or impromptu manner. As will be discussed below, in some implementations, when a scheduled meeting event arises, the participants who accepted the invitation can be contacted to determine whether said users would like to authorize the virtual assistant temporary access to their data.

In addition, the term "scheduled meeting" as used herein will be understood to generally refer to a communication session that has been scheduled for a particular date/time. It should be understood that the disclosed implementations may also be applicable to meetings that have not yet been scheduled or occur on the spur of the moment. For example, as a user is creating the meeting, or if a general meeting notice is communicated and the time/date is to be announced or determined at a later time (TBA/TBD), before a meeting has been finalized, or two or more people who decide that they would like to initiate a meeting at the present moment.

Furthermore, while the terms "call" or "calls" will be used in the description, the described systems and methods are also applicable to session-based telecommunications in general and are not limited to voice calls. It will also be appreciated that the systems and methods are not limited to sessions and are applicable to messaging-based or packet-based communications. Thus, conference calls can include exchange of as any combination of voice data, video data, text data, image data (e.g., presentation data), file data, or any other types of data.

As noted above, the option to grant access to the virtual assistant to a user's data during a scheduled meeting (or impromptu meeting) can be configured to occur at various workflow instances of a meeting lifecycle and can have an effect on both the authorization process as well as aspects of the meeting itself. A meeting lifecycle includes the time during the meeting, as well as the time prior to the meeting and the time after the meeting. The workflow instances for a meeting therefore include any step, event, action, or communication associated with the meeting, and can include but is not limited to creation of the meeting, receipt of a meeting invitation ("invite"), communications between invitees of the meeting, meeting documents shared with invitees, agenda or calendar notifications related to the meeting, meeting updates, and so forth. Furthermore, the following implementations may refer to the concept of "first view", which refers to an instance in which a participant first engages with information for the meeting; for example, while creating the meeting or when initially receiving and opening or accessing the meeting invite.

As introduced above, applications such as word processors, publishers, spreadsheets, presentation software, and others can be used to generate electronic documents or content. In general, the term "electronic content" or "document" includes any digital data that may be presented (e.g., visually or audibly presented), including but not limited to an electronic document, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI, and other digital data. As an example, this electronic content may include spreadsheets, word documents, calendars, personnel information, employee data, images, presentations, or other digital-based media.

Furthermore, within some types of documents, the electronic content can be understood to include elements that will be referred to as content portions, or more simply, portions. A "content portion" can be understood to include any part of electronic content that is defined or discernible as a part. For example, a content portion may be automatically discerned from a characteristic of the content portion itself (e.g., a letter, number, word, sentence, paragraph, section, image, symbol, or chapter of an electronic document, or other file format designation) or may be manually defined by a reviewer or end-user (e.g., selected collection of words in an electronic document, a selected portion of a digital image, a selected group of cells in a spreadsheet, a selected region in a slide from a presentation). Examples of content portions include portions or pieces of electronic text or other material within an electronic document, comments, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by reviewers within electronic content, including instances of scripted and non-scripted dynamic content and the like.

As a general matter, usage of the term "temporary data access" or "temporary access" or "data access" refer to the capability of a user to grant a specified access to a virtual assistant for a limited duration (e.g., the duration of the meeting session) and establish a connection between a system hosting the conference event and one or more user data storage sites associated with a particular attendee when a predetermined date and time occurs and/or specified conditions are met. For example, if the temporary data access feature is enabled by a user, the system can be configured to grant the specified access level defined by user for the duration of a meeting, and under the specified rules. However, the access token will not become active until the session starts and the user signs in to the session.

Furthermore, references to a communication application, a scheduling application, an organizer application may be understood to refer to any software applications configured to provide a means of scheduling, viewing, modifying, joining a meeting, and/or communicating or transmitting or receiving data associated with the meeting. This can include any type of electronic calendar or electronic scheduling system that is capable of tracking a user's meetings or appointments. Some such programs can include Skype™, Microsoft Teams™, Microsoft Outlook™, GoToMeeting™, WebEx™, Zoom™, Join.Me™, Google Hangouts™, AnyMeeting™, and other applications that can provide conferencing tools and/or facilitate communication or collaboration online. These are non-limiting examples, and any other communication-related application may benefit from the disclosed implementations. Specific references to a software application by name throughout this description should not therefore be understood to limit the use of the proposed systems and methods. It should further be understood that in some implementations, the application used to enable temporary data access function may differ from the application used to schedule the meeting, while in other implementations, they may be the same.

Figure 1B:
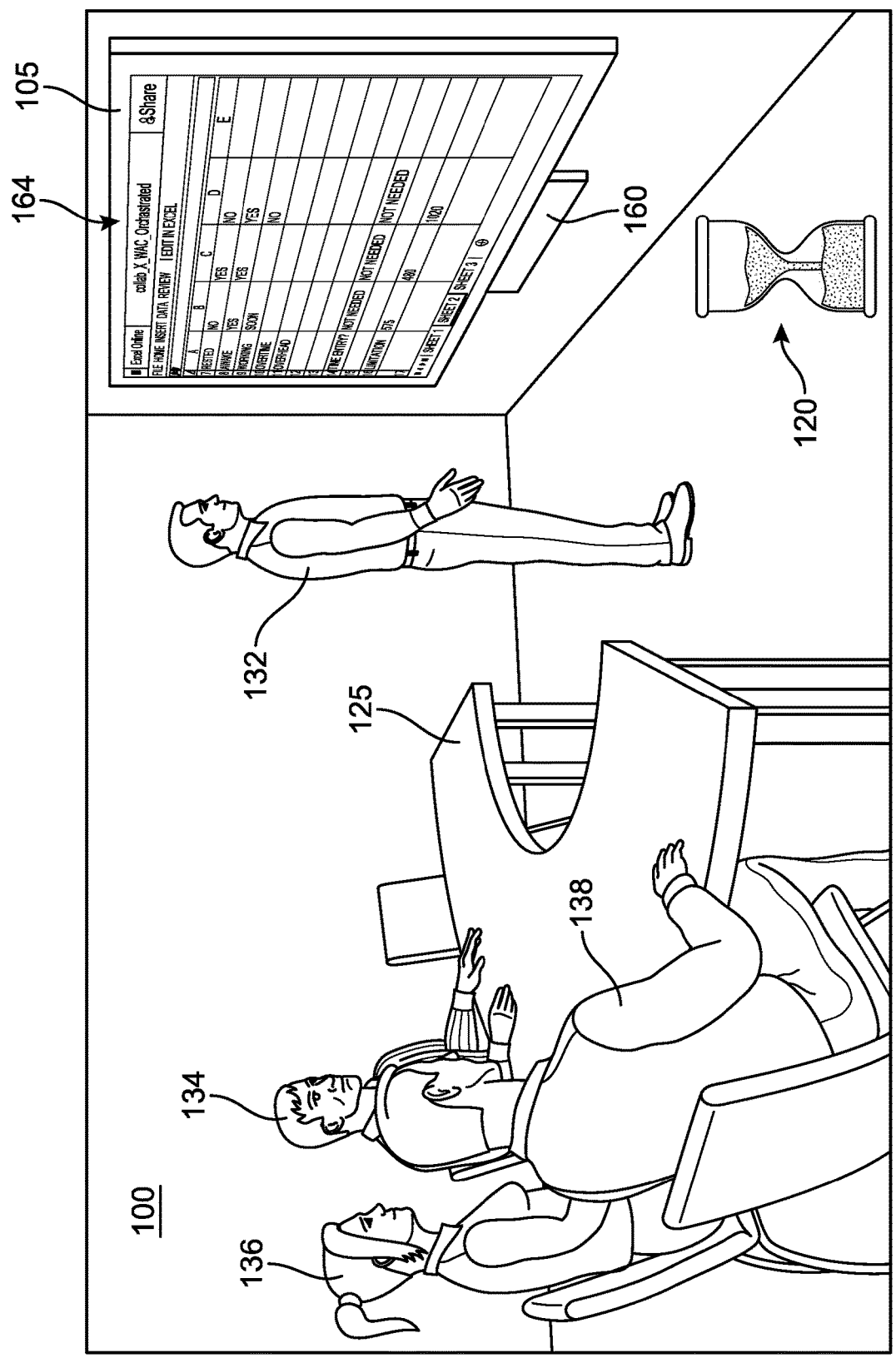
Figure 1C:
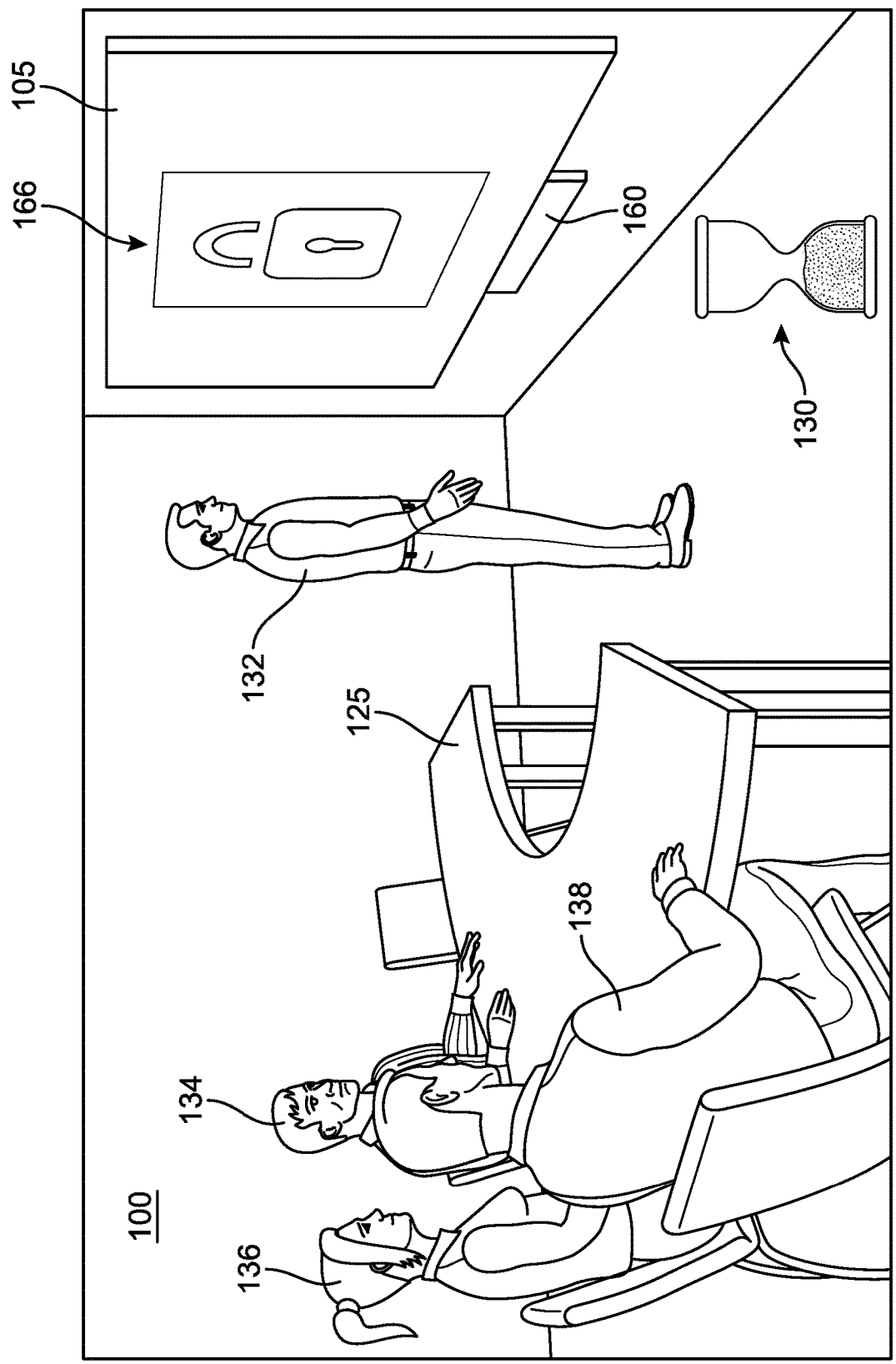

In order to better introduce the technical solutions offered by the disclosed systems and methods, FIGS. 1A-1C present a high-level example of a representative meeting environment ("environment") 100 for implementing a conference management system. In different implementations, the environment 100 can include one or more meeting attendees or simply "participants". In this example, a first user 132 stands adjacent to a large viewscreen 105 such as a computing device display, television, or projector screen, and a second user 134, a third user 136, and a fourth user 138 are seated at a conference table 125. A first hourglass symbol 110 indicates that the meeting is in progress (i.e., the current scene is occurring within the period of time during which the meeting event was scheduled).

In FIG. 1A, the first user 132 is accessing a virtual assistant configured for use with this meeting room via a computing device 160 located in the room. It can be understood that the computing device 160 is configured for connection to a network. As first user 132 initially signs-in to the meeting via a meeting scheduler application or the virtual assistant, the first user 132 may further submit a request or confirmation that serves as authorization for the virtual assistant to be granted temporary access to one or more data points associated with an account of the first user 132. For purposes of illustration, this process is shown in FIG. 1A by a message 162 "Temporary Data Access Authorization Request: Stanley Nylund" that lets the user know that his request has been processed by the virtual assistant or other agent.

In FIG. 1B, the first user 132 has submitted a second request to the virtual assistant to retrieve a specific electronic content item 164 and present it on the viewscreen 105. For example, the first user 132 may speak a natural language command such as "Hey Cortana, show us the Legal Document I created yesterday". In response, Cortana—having been granted temporary access to the first user's 132 cloud storage account—proceeds to identify the content item 164 corresponding to the user's request and display the content item 164 on the viewscreen 105. At this time, a second hourglass symbol 120 indicates that the current time continues to align with the prescheduled meeting occurrence.

In contrast, in FIG. 1C, a third hourglass symbol 130 indicates that the scheduled meeting time has passed, and the current time is outside of that period. In response, the system has automatically revoked or terminated the temporary access to the first user's 132 data. Thus, when the first user 132—or any of the other participants—attempt to continue to access the first users' 132 electronic content items via the virtual assistant, no further data can be accessed, and the users can be informed that the authorization has expired by presentation, for example, of a locked symbol 166.

Throughout this application, references will be made to a host agent or virtual assistant. Virtual assistants, such as Siri™, Google Now™, Amazon Echo™, and Cortana™, are examples of a shift in human computer interaction. A user may rely on a virtual assistant to facilitate carrying out certain computer-implemented tasks. In operation, the user may directly issue a spoken command to the virtual assistant, such as by uttering, "Assistant, set up an appointment with John Smith on Tuesday at 10 o'clock AM." The virtual assistant applies natural language processing to interpret the user's spoken command, and then carries out the user's command.

A virtual assistant may also be referred to as a virtual assistant system, a digital assistant, a digital assistant system, a digital personal assistant, and/or an automated agent. As a general matter, such terms should be understood to encompass a processing environment that is adapted to utilize spoken cues from utterances spoken in session to influence a render state for an interface serving as a meeting assistant. Thus, some or all of the processing environment may be referred to as, included in, and/or include the virtual assistant. For example, in some implementations, this processing environment includes a virtual assistant including an interpretation module, an action-taking module, a response generation module, a knowledge access module, a virtual assistant information store, and a user information store. In such implementations, the virtual assistant may include program interfaces allowing other modules of processing environment to interact with, control, and receive information from the virtual assistant.

In different implementations, the participants of a meeting (e.g., first user 132, second user 134, third user 136, and fourth user 138) may interact with the processing engine using one or more devices, such as computing device 160. In some examples, a telecommunication service used to implement a meeting session may include features enabling the participants to interact with the processing engine without requiring additional user devices to implement specific features for interaction with processing engine. In addition, in some implementations, the processing engine can include a participants identification module configured to identify the participants participating in a spoken conversation session. In some implementations in which the session is provided via a telecommunication service (such as a teleconferencing system), the telecommunication service may be configured to identify to processing environment the participants of the session (for example, such information may be collected by the telecommunication service as part of performing access control and/or identification of participants of session). In some examples, some or all of the participants may each be associated with a respective persistent unique identifier such as, but not limited to, a username or a user ID, that is used across multiple conversation sessions. In some examples, a temporary unique identifier may be associated with each participant, and simply used by processing environment to distinguish one participant from another during the spoken conversation session. In other implementations, as shown in FIGS. 1A-1C, where participants are not signed into individual devices, the processing engine can be configured to identify each user by their voices or following video-based identification techniques.

Various examples of techniques and systems involving virtual assistants, interpretation of spoken utterances, and responding to such utterances are described in U.S. Patent Application Publication Numbers US 2017/0140041 (titled "Computer Speech Recognition And Semantic Understanding From Activity Patterns" and published on May 18, 2017), US 2017/0124447 (titled "Identifying Relevant Content Items using a Deep-Structured Neural Network" and published on May 4, 2017), US 2017/0092264 (titled "Detecting Actionable Items in a Conversation among Participants" and published on Mar. 30, 2017), US 2017/0060848 (titled "Distributed Server System for Language Understanding" and published on Mar. 2, 2017), US 2017/0018271 (titled "Delayed Binding in Response Selection During Input Understanding Processing" and published on Jan. 19, 2017), US 2016/0373571 (titled "Use of a Digital Assistant in Communications" and published on Dec. 22, 2016), US 2016/0335138 (titled "Digital Assistant Extensibility to Third Party Applications" and published on Nov. 17, 2016), US 2016/0307567 (titled "Context Carryover in Language Understanding Systems or Methods" and published on Oct. 20, 2016), US 2016/0210363 (titled "Contextual Search Using Natural Language" and published on Jul. 21, 2016), US 2016/0203331 (titled "Protecting Private Information in Input Understanding System" and published on Jul. 14, 2016), US 2016/0196499 (titled "Managing User Interaction for Input Understanding Determinations" and published on Jul. 7, 2016), and US 2016/0171980 (titled "Digital Assistant Voice Input Integration" and published on Jun. 16, 2016), as well as U.S. Pat. No. 10,176,808 (titled "UTILIZING SPOKEN CUES TO INFLUENCE RESPONSE RENDERING FOR VIRTUAL ASSISTANTS" and issued on Jan. 8, 2019) each of which are incorporated by reference herein in their entireties.

Figure 2:
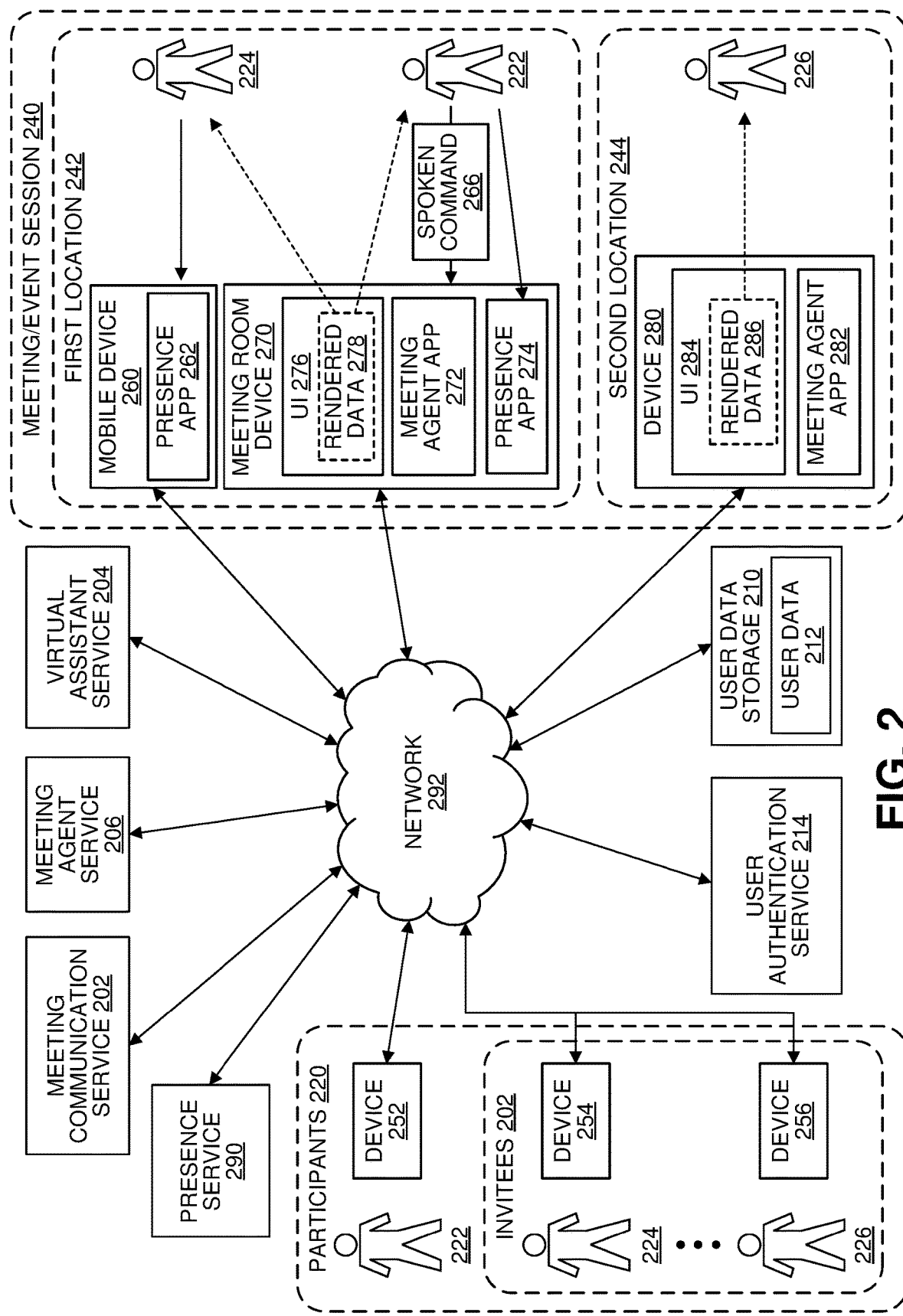
FIG. 2 is an implementation of temporary data access authorization system.

Referring now to FIG. 2, a system 200 is presented for purposes of clarity. The system 200 includes a meeting communication service 202 to establish meeting sessions by which a plurality of individuals may communicate in real-time. A meeting session, or simply "session" refers to a limited-duration activity, such as the occurrence of a meeting. In some examples, the meeting communication service 202 provides a teleconferencing, screen-casting, and/or data presentation capabilities. The meeting communication service 202 also includes a virtual assistant service 204 configured to provide the virtual assistant services, described above with respect to FIGS. 1A-1C, within and during meeting sessions provided by the meeting communication service 202. The meeting communication service 202 also includes a meeting agent service 206 configured to interoperate with the virtual assistant service 204 and other elements of the system 200 to provide specific meeting session-oriented capabilities to meeting session participants via spoken commands processed and interpreted by the virtual assistant service 204. The meeting agent service 206 is further configured to provide meeting session participants with access to network-accessible data storage 210 in order to provide access to user data 212 (which may be referred to as a "user data set" or "data set") in response to valid authentication of a user authorized to access the user data 212. The user data storage 210 is configured to operate in combination with a user authentication service 214 which is configured to evaluate a received credential, such as but not limited to, a password or token (see, for example, FIGS. 6A and 6B) to authenticate access to the user data storage 210. The meeting agent service 206 is configured to interoperate with the user authentication service 214 in order to obtain credentials providing temporary session-limited access to the user data 212 in combination with appropriate confirmation from one or more participants authorized to access the user data 212. In support of this temporary session-limited access the user authentication service 214 is configured to receive and process such confirmations from meeting session participants and generate and respond to time restricted and session specific credentials for use by the meeting agent service 206 and/or other systems or services that may benefit from temporary session-limited access to the user data 212 in a manner that remains under control of the affected meeting session participants.

In the example shown in FIG. 2, on the left-hand side, a plurality of participants 220, including a first participant 222, a second participant 224, and a third participant 226, are shown for a meeting session 240 performed through the meeting communication service 202. In FIG. 2, in advance of the meeting session 240, the first participant 222 is organizing the meeting session 240 by use of a computing device 252. As part of this, the first participant 222 identifies one or more invitees 230, in this example including the second participant 224 and the third participant 226. As a result, the second participant 224 receives a notification of the meeting session 240 at a respective computing device 254. Similarly, the third participant 226 receives a notification of the meeting session 240 at a respective computing device 256. In some examples, as part of the process of organizing the meeting session 240, the first participant 222 may request that some or all of the invitees 230 provide temporary session-limited access to the user data storage 210 such as to the user data 212. In some implementations, the invitees 230 may individually confirm the requested access to the user data storage 210. In some examples, a meeting participant 220 may assert fine-grain control over various aspects of that access. For example, a participant 220 may specify particular restrictions for specific participants 220, as discussed herein.

On the right-hand side of FIG. 2, the plurality of participants 220 are shown while they are engaged in the meeting session 240. In this particular example, the first participant 222 and the second participant 224 are together at a first location 242. For example, the first location 242 may correspond to a meeting room specifically arranged and providing facilities for teleconferencing. The third participant 226 is also participating in the meeting session 240, but at a second location 244 remote from the first location 242. In order to indicate to the system 200 that second participant 224 is actively participating in the meeting session 240 the second participant 224 makes use of a first meeting presence application 262 executing on a mobile computing device 260 such as a smartphone device or tablet. The meeting presence application 262 is configured to interact with various elements of the system 200, such as meeting agent service 206 and/or the user authentication service 214, in order to notify the system 200 as to the second participant 224 being actively present and participating in the meeting session 240.

In different implementations, based on this information, the system 200 is configured to enable and disable access to user data 212 requiring authentication in connection with the second participant 224. In addition, a meeting room computing device 270 is installed at the first location 242 and is configured to execute a meeting agent application 272 for interacting with the meeting agent service 206. For example, the meeting agent application 272 may be configured to respond to commands received from the meeting agent service 206 resulting from spoken commands received and processed by the virtual assistant service 204 via the meeting room computing device 270 or another computing device available at the first location 242 or otherwise involved with the meeting session 240 and/or participants 220. The meeting agent application 272 may also be configured to present a first user interface 276 via which the user data 212 obtained from the user data storage 210 may be presented as a first rendered data 278. For example, this may occur in response to a first spoken utterance 266 spoken by the first participant 222, captured by the meeting room computing device 270, processed by the virtual assistant service 204, and handled by the meeting agent service 206. In some implementations, the first user interface 276 might be displayed using a projector or other large format display to facilitate viewing by multiple participants 220. In some implementations, the meeting room computing device 270 is configured to execute a second meeting presence application 264 which may be used much as described for the first meeting presence application 262 to enable participants 220 to identify when they are actively participating in the meeting session 240. For example, the meeting room computing device 270 might include a touchscreen console or other interface enabling a participant 220, such as the first participant 222, to indicate their presence without the aid of an additional computing device.

At the second location 244, the third participant 226 is participating in the meeting session 240 via a computing device 280. For example, the computing device 280 may be a laptop or desktop computer or may be configured similarly to the meeting room computing device 270 installed as a fixture at the second location 244. Much as described for the meeting room computing device 270, a meeting agent application 282 is executed on the computing device 280 and is configured to interact with the meeting agent service 206. Additionally, the meeting agent application 282 may be configured to present a second user interface 284 via which the user data 212 may be presented as a second rendered data 286 during the meeting session 240. In some examples, rather than using a meeting presence application executing on the computing device 280, the third participant 226 may instead utilize a meeting presence service 290, for example embodied as a website or other network-based service as a mechanism for indicating the active participation of the third participant 226 in the meeting session 240 to the system 200.

As shown in FIG. 2, the various services and computing devices communicate with one another via a network 292.

Figure 3:
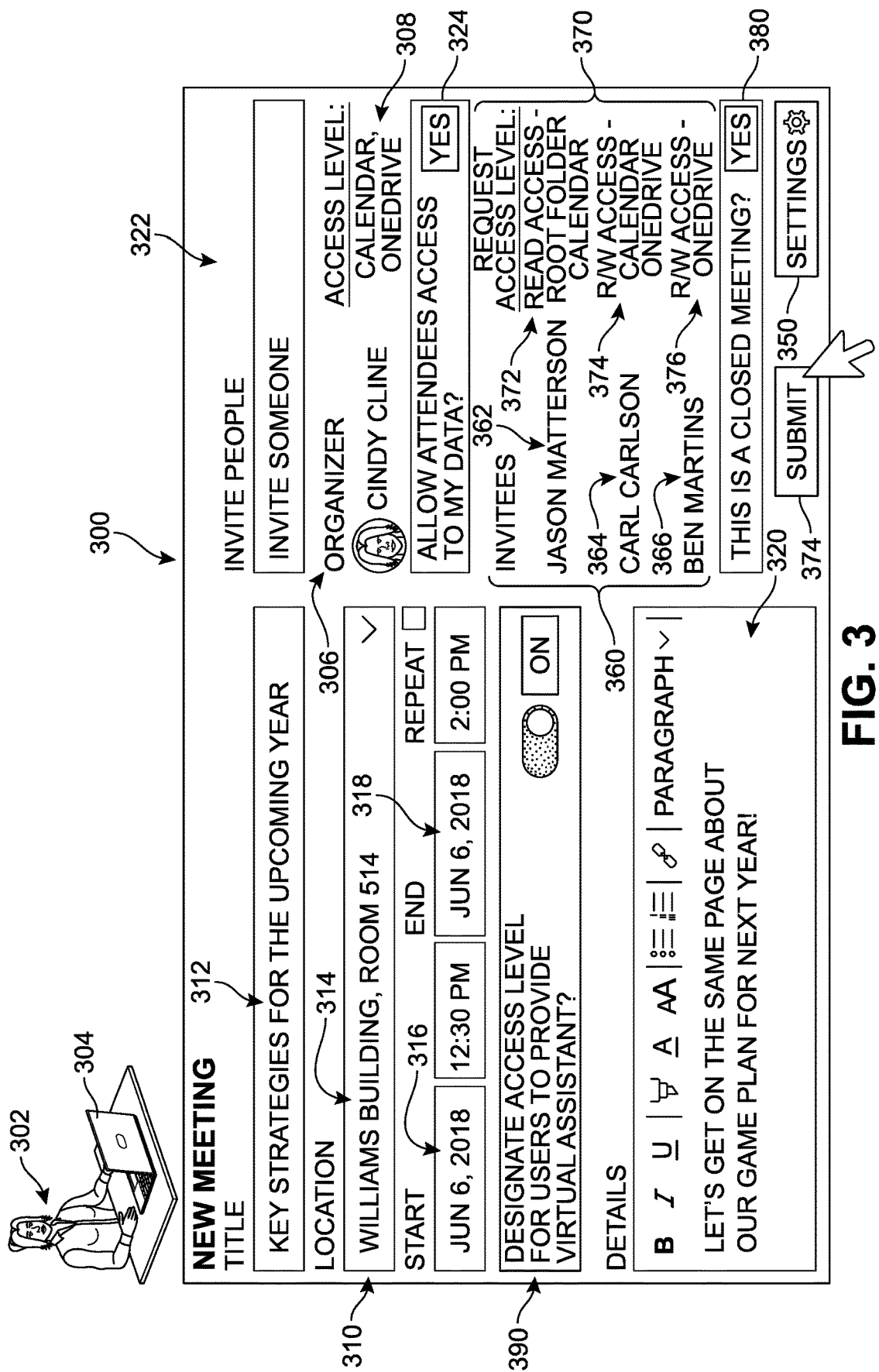
FIG. 3 is a display diagram illustrating an implementation of a user interface for an application configured to provide options for enabling a temporary data access feature while generating a meeting invitation.

Referring now to the sequence of FIGS. 3-10B, an example of the proposed technical implementations is presented. In FIG. 3, a new meeting is being scheduled by an organizer 302 at a computing device 304 via a native control, here illustrated as a scheduler user interface 300 of a scheduling application ("application"). For purposes of this description, a "native control" refers to a mechanism for communicating content through a client application to an application user. For example, native controls may include pop-up windows that may be presented to a user as software application user interfaces (UIs), interactive buttons, or other objects that may be shown to a user through native application UIs, as well as mechanisms that are native to a particular application for presenting associated content with those native controls. In different implementations, a native control can include any other type of user interface such as a dialog box, notification, alert, reminder, email, instant message, or other application communication or presentation means. In addition, a "trigger event" or "triggering event" refers to an event (or specific sequence of events) associated with a particular use of an application, which corresponds to a selection of an option offered via a native control, or an event that matches a condition. In FIG. 3, the triggering event may be understood to include a 'click', toggle, or other input actions (such as a mouse left-button or right-button click, a touchscreen tap, a selection of data, or other input types).

The scheduler user interface 300 includes a plurality of fields 310 for receiving meeting-related input, including but not limited to a title field 312 ("Key strategies for the upcoming year"), a location field 314 ("Williams Building, Room 514"), a start field 316 (Jun. 6, 2018 at 12:30 PM), an end field 318 (Jun. 6, 2018 at 2:00 PM), a meeting details field 320 ("Let's get on the same page about our game plan for the next year!"), and an participants selection section 322. In different implementations, the application can also be configured to present additional or other options to a user. As one example, a selectable option 390 is included by which an organizer may request that participants permit temporary access (to a specified level) to the virtual assistant to the participant's data. In FIG. 3, the selectable option 390 is shown in an active or "ON" mode, indicating that the user has opted to activate this feature and be shown options and settings corresponding to such a selection. While the selectable option 390 is positioned beneath the start/end fields in FIG. 3, it should be understood that in other implementations, the option may appear differently and/or may be displayed or generated anywhere else on the screen(s) associated with the client's system, including spaced apart from, adjacent to, or around the scheduler user interface 300.

Furthermore, while in some cases the default setting is that virtual assistant temporary access is disabled, in other implementations, the default or initial setting may be that the virtual assistant should be provided temporary access. This default may also be established by the user by a general settings option (see FIG. 11). In different implementations, the system can be configured to allow the organizer to specify the access level for one or more meeting participants, and this process can occur as each participant is chosen. In some implementations, such options may be offered or shown to the organizer 302 only if the selectable option 390 was enabled.

In the example of FIG. 3, as the organizer 302—represented in the participants selection section 322 as a first participant 306 ("Christie Cline")—adds or selects individuals to invite to the meeting, she is also able to designate or identify an access level or type for each individual. In this case, the organizer 302 has entered a request identifying that only her Calendar and OneDrive (i.e., cloud storage account) be temporarily accessible to the virtual assistant during the meeting being scheduled (see an organizer access designation 308). In other words, at the time of the meeting, the organizer 302 expects the virtual assistant to respond to requests by the organizer for electronic content associated with both her calendar and her cloud storage account. Furthermore, in some implementations, a first option 324 can be selected by the organizer 302 to allow the meeting attendees to also have permission to request the virtual assistant to present her data (see FIGS. 9A and 9B).

In some implementations, as each invitee is selected, the organizer 302 can be shown a separate native control by which she may designate the access level desired for this particular invitee. In other words, the organizer can customize the various access levels for each user that she feels would be of utility to her meeting. In this example, the organizer 302 has identified a plurality of invitees 360, including a first participant 362 ("Jason Matterson"), a second participant 364 ("Carl Carson"), and a third participant 366 ("Ben Martins"). At the time each participant was identified for adding to the invitees list (e.g., via a drop-down menu or address book), the system allowed the organizer 302 to specifically select a type/level of access grant 370 desired for each participant.

In FIG. 3, the first participant 362 has been assigned a first access designation 372, the second participant has been assigned a second access designation 374, and the third participant 366 has been assigned a third access designation 376. Each designation can (a) identify the type of access (e.g., Read Access Only, Read and Write Access) and (b) the data category, sites, or stores that are specifically targeted by the access and that the access will be limited to. In this example, the first access designation 372 includes a read access of the first participant's root folder, as well as the first participant's calendar. In addition, the second access designation 374 includes a read/write access of both the second participant's calendar and the data stored on the cloud storage associated with the second participant's account. The third access designation 376 includes a read/write access of data stored on the cloud storage associated with the third participant's account. It should be understood that in different implementations, the selection of such designations is optional, a universal or default designation can be identified for all participants, and the designation(s) can be modified (or disregarded) by the invitees, it can be helpful to the participants to receive information or guidance regarding the type and level of access that the organizer believes is required or best suited for this meeting. While in this case the designation options were presented via a drop-down set of choices (not shown) presented by the application in response to selection of each participant, it should be understood that in other implementations, the option may appear differently and/or may be displayed or generated anywhere else on the screen(s) associated with the client's system, including spaced apart from, adjacent to, or around the scheduler user interface 300, as well as via another user interface or expanded section of the scheduler user interface 300.

In addition, in some implementations, the scheduler user interface 300 can be configured to provide a second option 380 to classify this meeting as a closed meeting. If the meeting is closed (as shown here), individuals not directly invited (i.e., not members of the invitees list) are not permitted to attend, and therefore will not be beneficiaries of the content items that will be shared as a result of the temporary data access that may be granted to the virtual assistant. For example, if an outsider attempts to join the meeting, he or she will not be able to submit any requests to the virtual assistant for any content items that are temporarily accessible to the virtual assistant, despite enablement or selection of first option 324.

Once the organizer 302 has finalized the meeting invitation, she may submit the request (see a third option 374). In some implementations, the application may also provide an (optional) settings option 350, which will be discussed further below with respect to FIGS. 11 and 12. It should be understood that a Settings option may be made available on each of the user interfaces described herein, whether or not explicitly identified.

Figure 4:
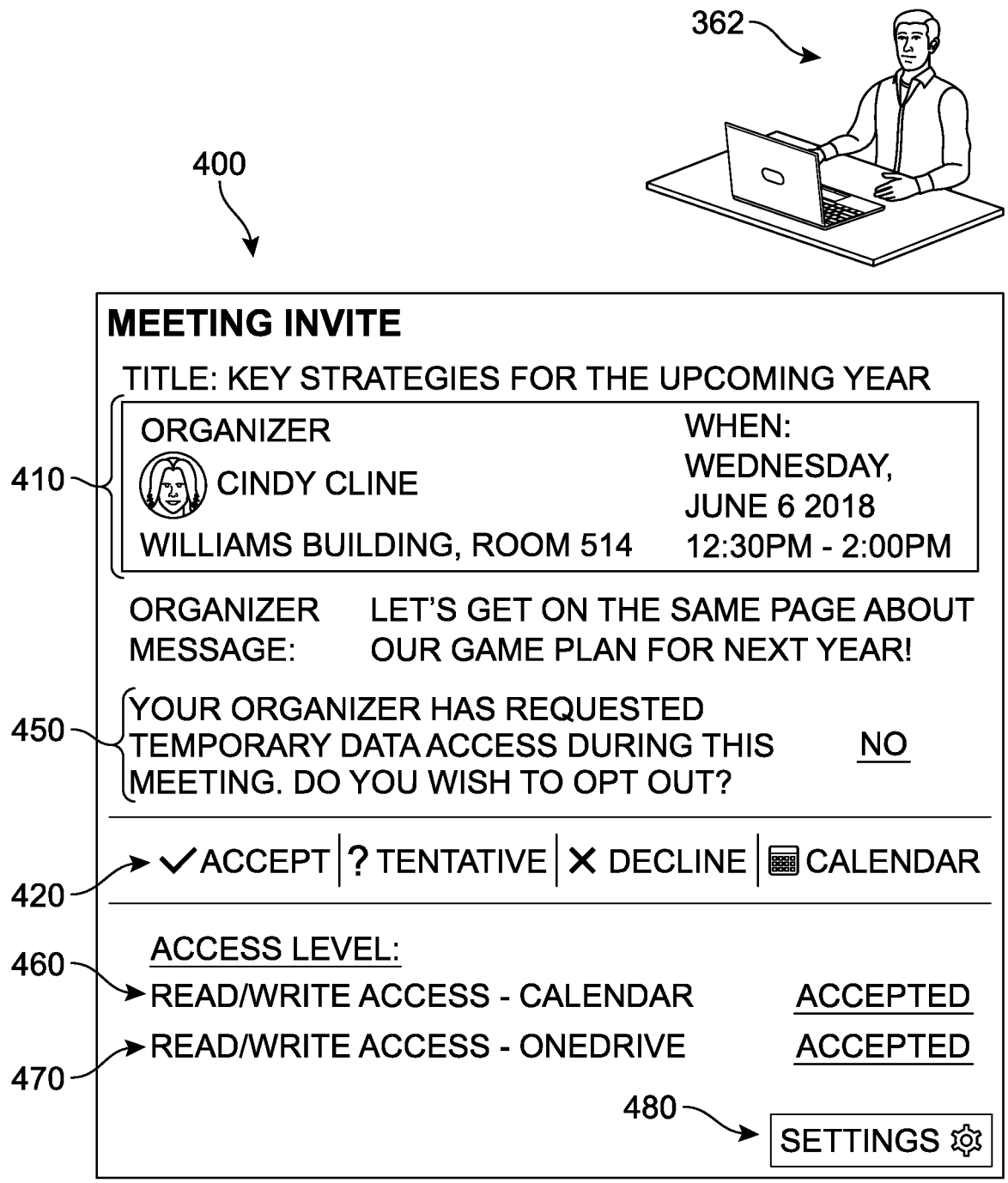
FIG. 4 is a display diagram illustrating an implementation of a user interface for an application configured to provide options for enabling a temporary data access feature while viewing a meeting invitation.

In different implementations, the system described herein can include provisions for facilitating enablement of temporary access to the virtual assistant prior to the meeting. For example, as noted earlier, during different stages leading up to the meeting, the participants can access various options or settings to configure or modify the type or level of temporary access desired. FIG. 4 presents one example of a first viewing of a meeting invite 400 corresponding to the new meeting that was generated with reference to FIG. 3. In FIG. 4, the third participant 364 is shown in receipt of meeting invite 400 that includes meeting information 410 specifying the various logistical details for the meeting, including when it is scheduled, where it will be held, and other such information. The invitation user interface 400 further includes a set of attendance response options 420 with various selectable options. These can be selected by a user to facilitate the submission of a response by the user for the meeting. This depiction may be understood to represent a user's first view or "first instance" of the meeting information, or may also generally represent subsequent views of the invitation, a reminder invitation generated by the system, or other types of meeting-related information instances.

In this example, a notification 450 is also presented informing the third participant 364 that the organizer has requested that the third participant 364 authorize temporary access during this meeting. In some implementations, the application can offer an immediate 'opt-out' whereby the user can simply reject the activation of this feature. If he does not opt-out ("NO"), the meeting invite interface can expand to display additional options. In this case, because the organizer had identified two different access levels/types for the third participant, the meeting invite 400 shows two options, including a first access option 460 specifying the first data category that was requested and a second access option 470 specifying the second data category that was requested. In FIG. 4, the third participant 362 has agreed to both of the categories that were identified by the organizer. Thus, at the time of the meeting, following submission of the requisite authorization by the third participant 362, the virtual assistant will be granted temporary access to these two levels/types of data. In other implementations, the application may also be configured to display further temporary access options, such as the addition of other levels or types of access, limitations on the duration of the access, permission by other attendees to access the data during the meeting (as shown in FIG. 3), limitations on the availability of the data to other participants, or other such settings, for example by selection of a Settings menu option 480. In other implementations, the third participant 362 can return to a general settings menu (see FIG. 11) at any time to modify these selections. In addition, it should be understood that, in different implementations, a user may continue to receive information for a specific meetings on a collaboration, calendar, or agenda component of a conferencing application, and one or more of those instances can include options to modify the temporary data access selections. Each instance can include information that provides a user with details or a message associated with a specific or particular conference event as well as an option to enable or modify temporary data access features. A user may receive one, two, three, or multiple instances over the course of the pre-meeting workflow, where each instance that occurs is in some way related to the upcoming scheduled meeting. These notifications or indicators can also occur once the scheduled meeting has begun, for example, via a reminder email to the user that has failed to sign-in to the meeting at the scheduled time.

Figure 5:
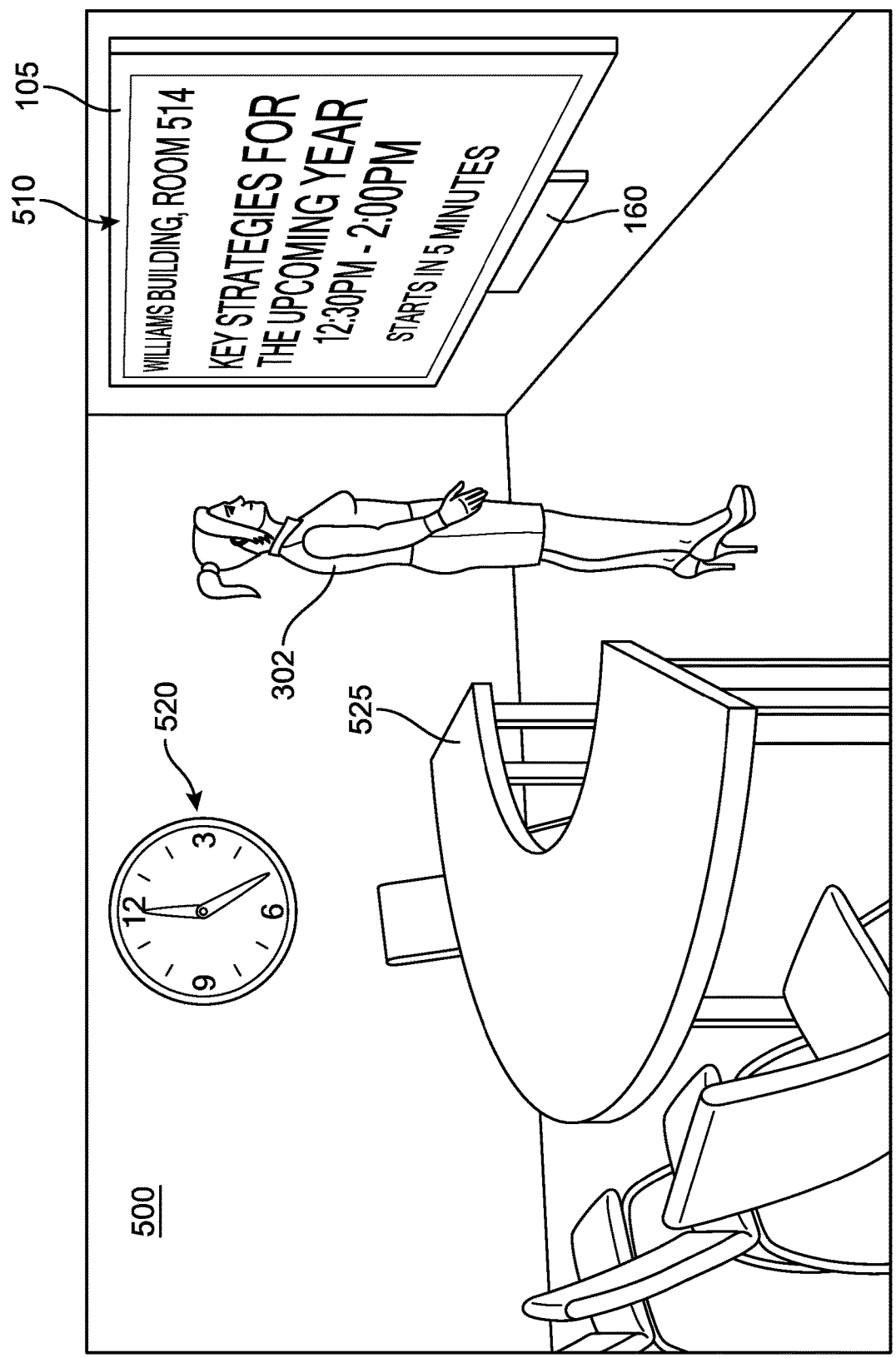
FIG. 5 is an implementation of a meeting room in which a meeting is scheduled.

For purposes of clarity, FIGS. 5-10B present an implementation of a scenario in which a meeting event for which temporary data access has been enabled is attended by a plurality of participants. In FIG. 5, the organizer 302 has entered a conference room ("room") 500 that includes a conference table 525 and a viewscreen 505. In some implementations in which the meeting was pre-scheduled, the viewscreen 505 can display a welcome message 510 for the users' benefit including, for example, information about the meeting and/or a countdown timer reflecting the time left before the meeting session is scheduled to begin. In this case, a time 520 (12:25 PM) is shown on a clock, which corresponds to the remaining time shown on the viewscreen 505 ("Starts in 5 minutes"). In many cases, an organizer can enter the room earlier than the scheduled time to make final preparations for the meeting and set-up equipment or review various room system configurations.

Figure 6A:
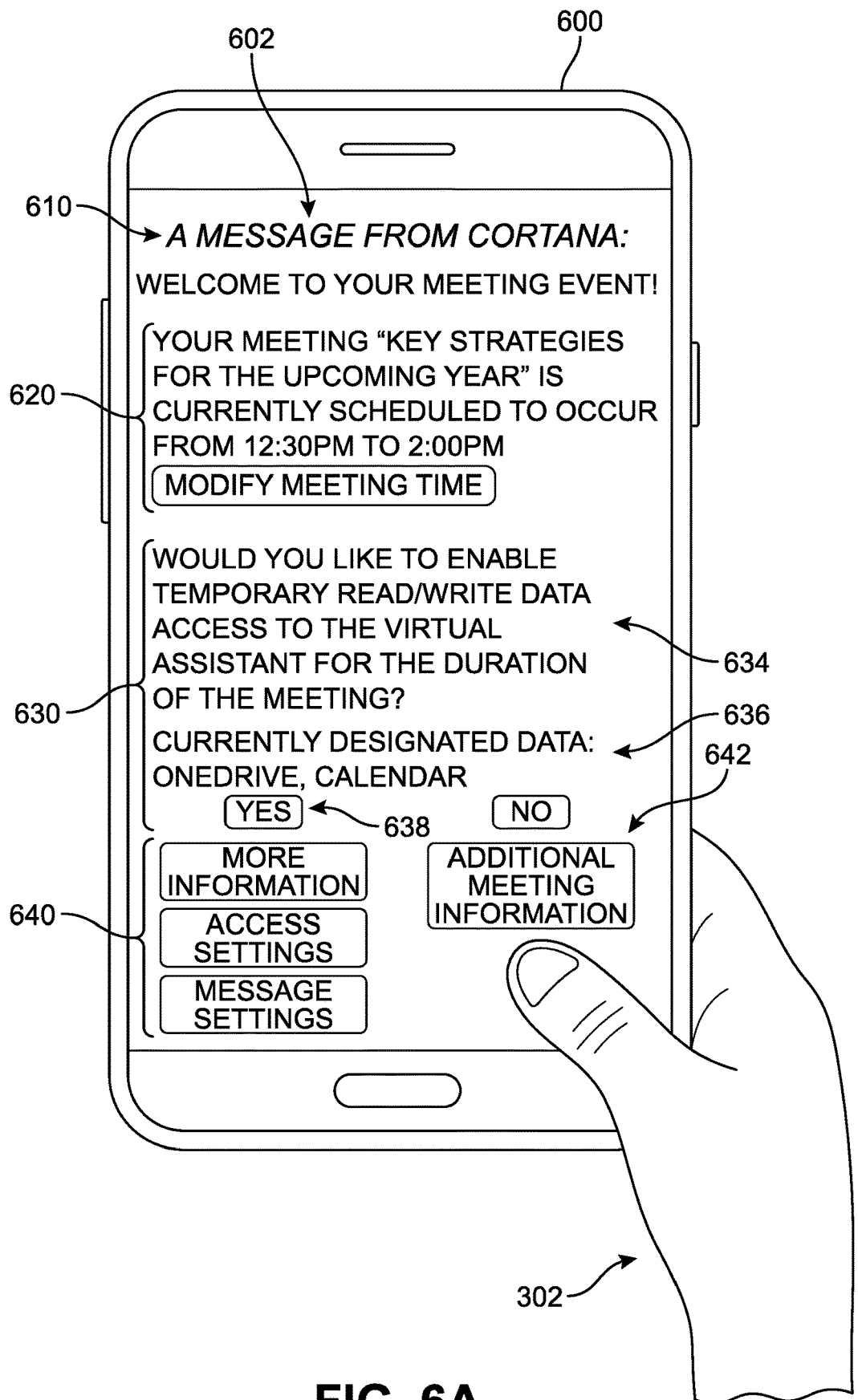
FIGS. 6A and 6B are display diagrams illustrating an implementation of a user interface for an application configured to provide options for providing authorization to proceed with enabling a temporary data access feature during an upcoming meeting.
Figure 6B:
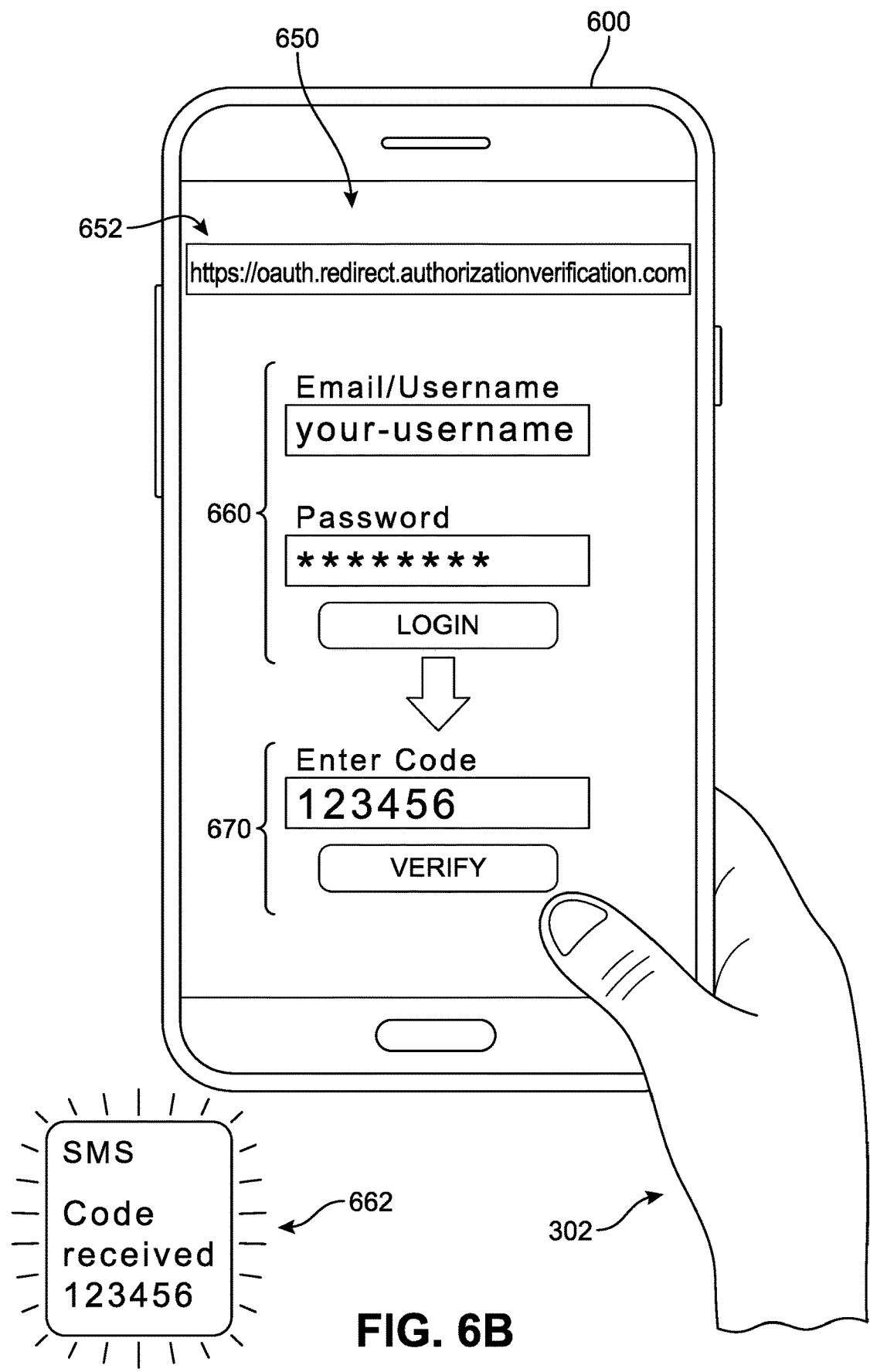

Upon entering room 500, the organizer's 302 presence may be automatically registered or detected by the meeting room system in some implementations. In other implementations, the organizer 302 can transmit or input a signal to the system that corresponds to a 'meeting sign in' event. As described in greater detail with respect to FIG. 2, in response to this event, in some implementations, the meeting event service can initiate an authorization process. One example of such a process is represented in FIGS. 6A and 6B. In FIG. 6A, in response to the determination that the organizer has entered the meeting room, a message 610 can be transmitted to a registered account for an application on (for example) a client device 600 associated with the organizer 302 (here represented by a hand). In this case, the message 602 can be presented on behalf of the virtual assistant for the meeting, as indicated by a header 610. In other implementations, the application may operate independently of the virtual assistant, and the message 602 can differ in appearance and context. The message 602 further includes an option organizer specific option 620 by which the organizer may modify the scheduled meeting time. The message 602 also includes a temporary access authorization option 630, which includes an access query 634 corresponding to the previously established access settings selected by the organizer, a description or summary of the organizer's designated data 636, and input options 638 ("YES" and "NO"). Other types of access-related settings may also be provided, as illustrated by a settings submenu 640 and meeting-specific options, such as an option 642 ("Additional meeting information") that may be actuated by the user to navigate to other menus from which the user can review or change various parameters associated with the meeting and/or temporary access.

If the organizer 302 wishes to enable the temporary data access, and selects "YES", in some implementations, the application may redirect the user to another interface specially configured to authenticate the organizer and verify the authorization being provided. In FIG. 6B, one example of such a verification portal 650 is being shown via client device 600. In some implementations, this portal 650 can be a web-based interface 652, while in other implementations, the interface can be native to the client device. The portal 650 can include a type of interface through which the user can confirm their identity in order to ensure the permissions being granted by their presence and/or sign-in is authentic.

It may be appreciated that organizations may wish to increase or supplement the security process through which verification of a user occurs. While the example of FIG. 6B depicts a two-factor authentication (2FA) process, in other implementations, a more simple single-factor authentication (SFA) may be used, where the user simply presents an identification badge or physical security token in order to perform the verification. However, in many cases, additional steps or inputs may be required to better protect both the user's credentials and the resources the user can activate or select. As one example, two-factor authentication (2FA), an example of which is shown in FIG. 6B (sometimes referred to as two-step verification or dual factor authentication) may be incorporated by the system to verify user identities. Two-factor authentication often provides a higher level of assurance than authentication methods that depend on SFA. In FIG. 6B, the system requires a 2FA process in which users provide a first factor as well as a second factor. These factors can comprise possession factors or a physical security token (i.e., connected, disconnected, or contactless tokens), knowledge factors such as a password, and inherence or biometric factors such as an eye scan, fingerprint, or facial scan. Two-factor authentication adds an additional layer of security to the authentication process, which can decrease the likelihood of unauthorized users gaining access to an organization's devices or user accounts, because in such cases possession of the physical security token alone is not enough to pass the authentication check. In addition, though this process is shown taking place in conjunction with the client device 600, in other implementations the authentication can instead occur via computing devices that are associated with the meeting room.

It should be understood that, in other implementations, no authorization process beyond that shown in FIGS. 3 and 4 need be provided by the user. In other words, in some implementations, the enablement or activation of temporary data access at the time of the meeting invite generation or viewing of the invite can serve as sufficient authorization. In such cases, the act of signing in or being present at the meeting event will automatically trigger the initiation of temporary data access by the virtual assistant on behalf of the user. Similarly, with respect to FIG. 6A, in some implementations, once a user enabled temporary data access via their own personal device 600, the step shown in FIG. 6B need not be required, as the system can immediately enable the feature as requested without attempting to obtain further verification of the user's authorization.

Figure 7:
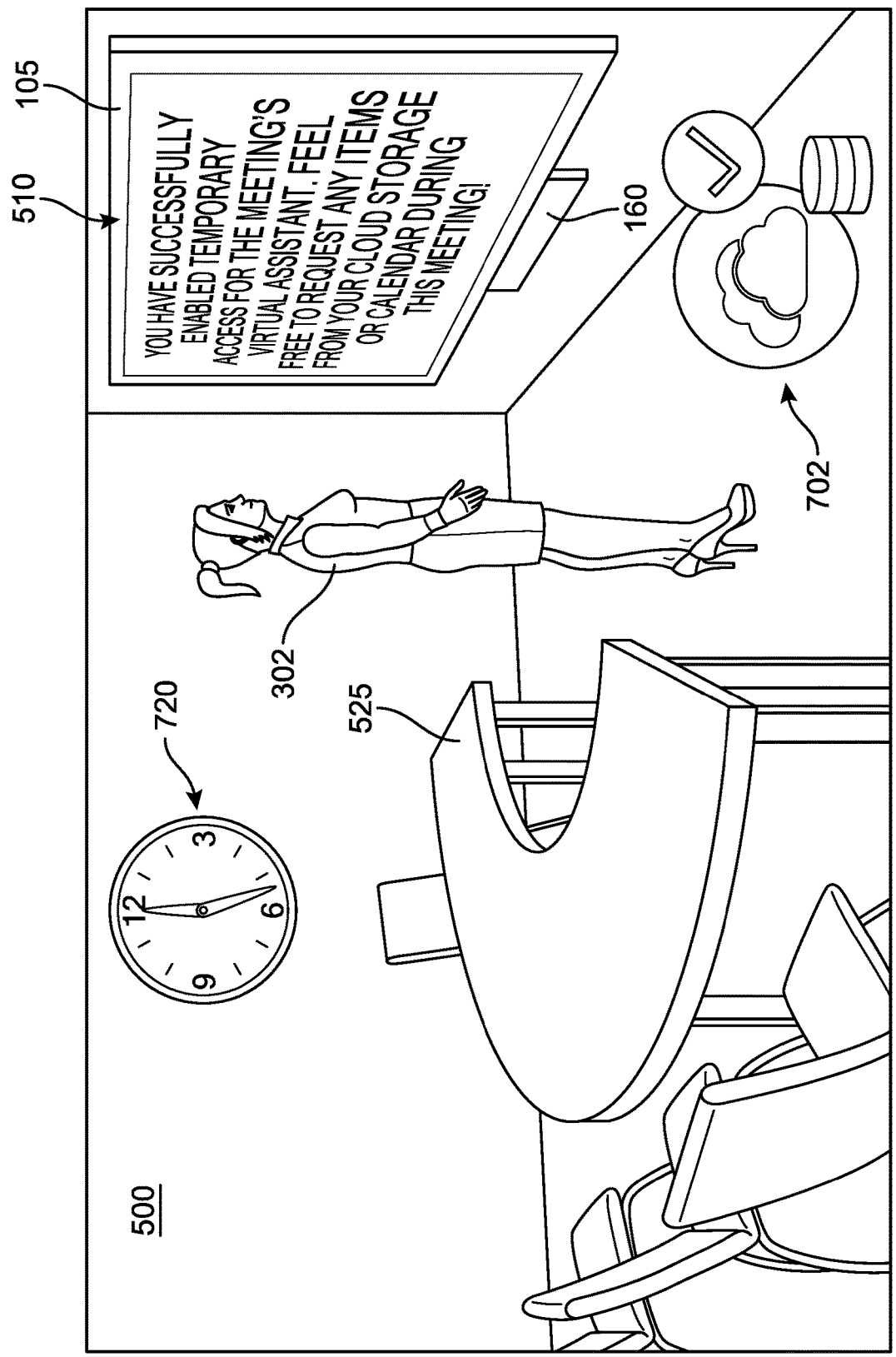
FIG. 7 is an implementation of a meeting room in which an organizer has successfully enabled the temporary data access feature.

In FIG. 7, the illustration returns to a view of the meeting room 500, where an optional confirmation message 700 is being displayed to the organizer 302 via viewscreen 505. In different implementations, the confirmation message 700 can be alternatively or also displayed on the client device itself. In this case, the confirmation message 700 ("You have successfully enabled temporary access for the meeting's virtual assistant. Feel free to request any items from your cloud storage or calendar during this meeting") informs the organizer at a second time 720 (12:27 PM) shortly after the first time 520 (see FIG. 5) that the authorization has been verified and, as represented by a cloud connection symbol 702, the designated access granted to the virtual assistant for the duration of this meeting event.

Figure 8A:
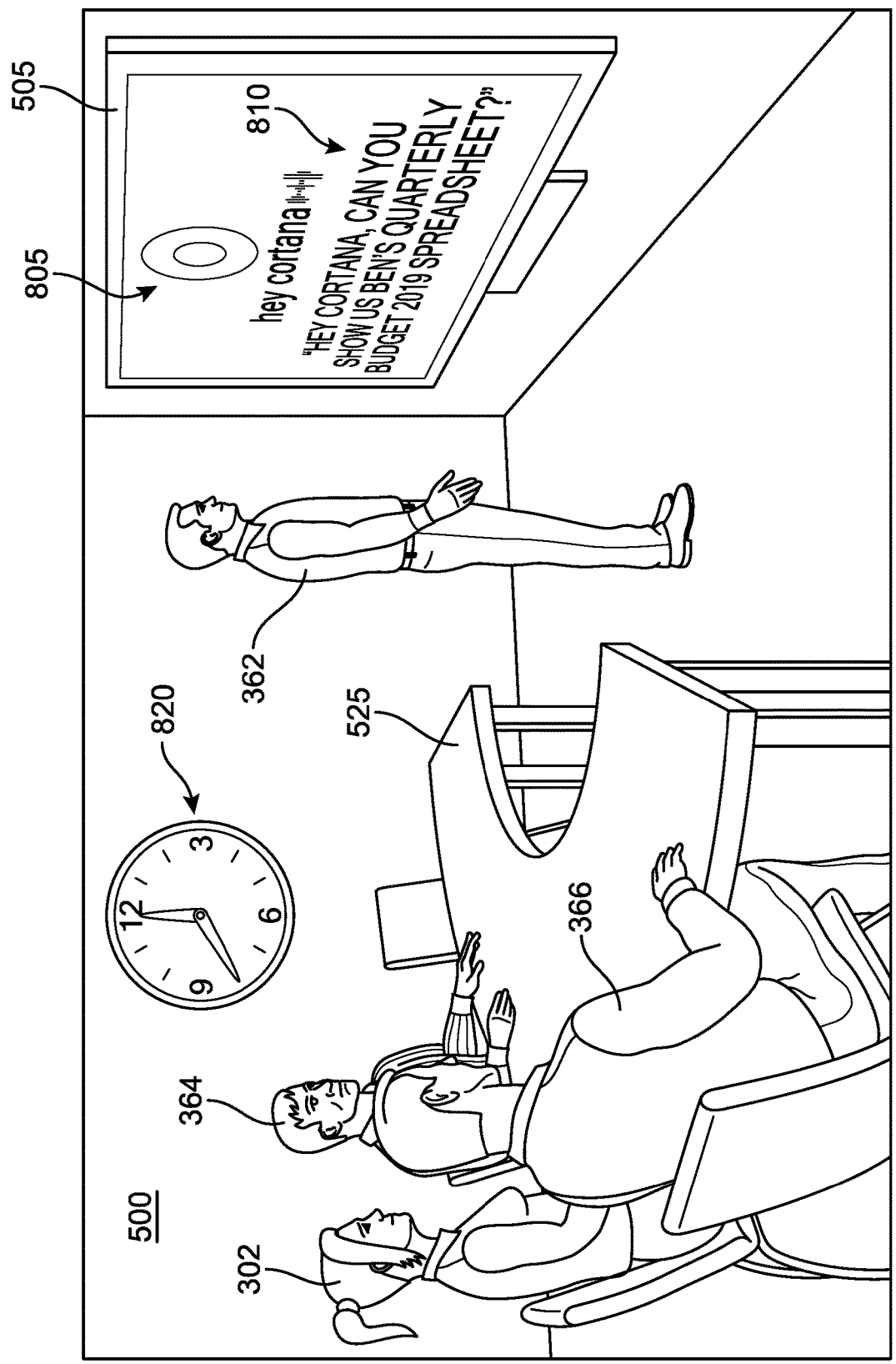
FIGS. 8A and 8B illustrate an implementation of a meeting event during which a first user requests a presentation of the first user's own data.

Referring now to FIG. 8A, it is seen that all participants have arrived in the meeting room 500, including the first participant 362, second participant 364, and third participant 366. For purposes of illustration, it may be understood that each participant is signed into the meeting event, and was presented (either via a personal device or the room computing device(s)) an authentication interface confirming their desire to grant temporary access to the virtual assistant. In this example, the first participant 362 ("Jason") and the third participant 366 ("Ben") have each granted the designated access to the virtual assistant. However, the second participant 364 ("Carl") has not. In other words, the second participant 364 declined the enablement of the temporary data access feature, and the virtual assistant does not have access to any data for Carl.

Figure 8B:
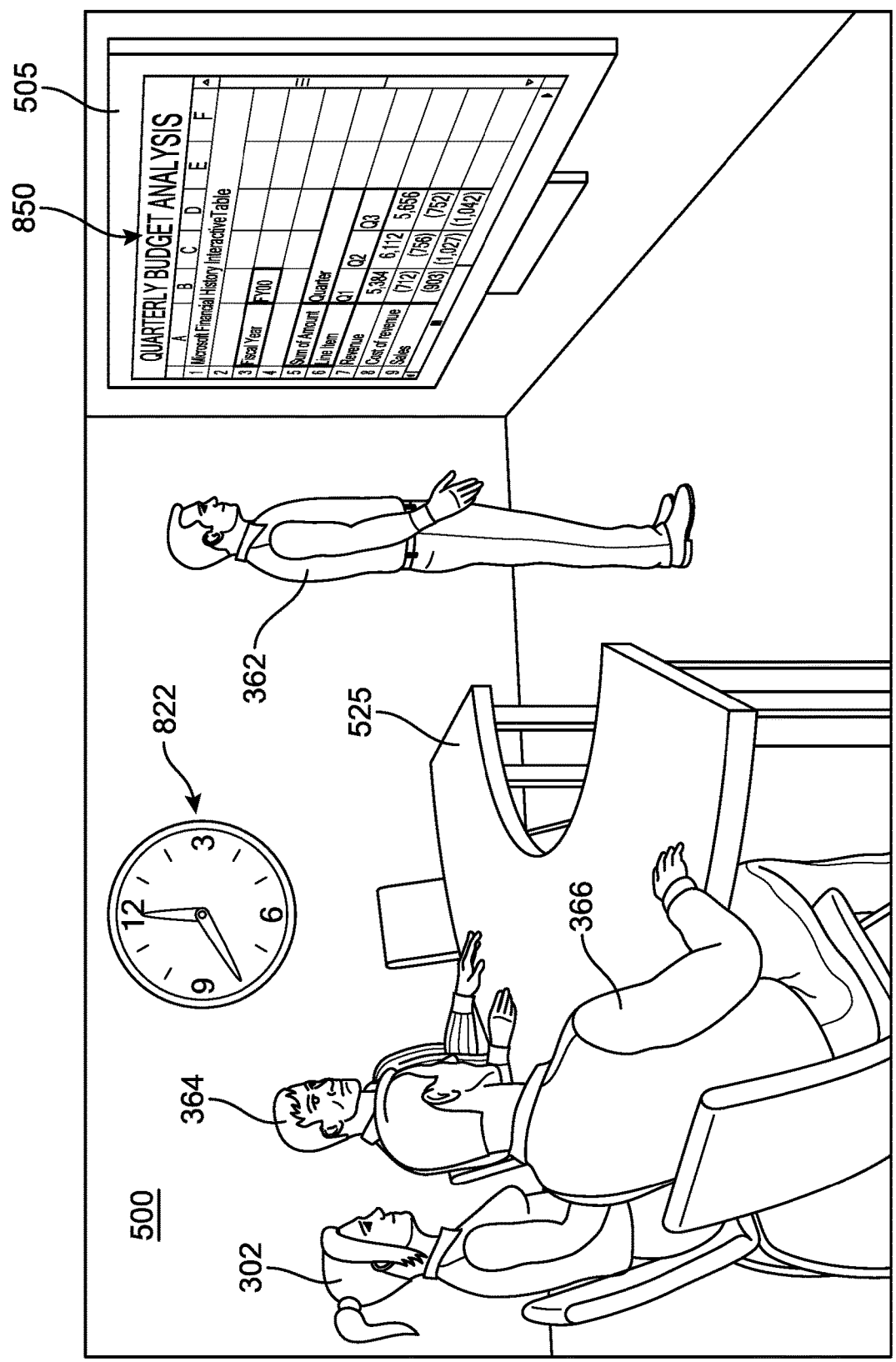

In FIG. 8A, at a third time 820 (12:40 PM) the third participant 366 voices a first request 810 for a particular electronic content item via a virtual assistant 805 (here, Cortana™) that is part of the third participant's 366 own data. The third participant's voice can be recognized by the virtual assistant as (a) belonging to a person attending the meeting and/or (b) belonging to the specific person identified as Carl. The first request 810 is represented by an optional corresponding transcription on the viewscreen 505 ("Hey Cortana, can you show us Ben's Quarterly Budget 2019 spreadsheet?"). Once the virtual assistant 805 receives the request, the virtual assistant can immediately communicate with the user's data storage sites and locate the designated file or content item. As shown in FIG. 8B, a first requested content item 850 (here a spreadsheet stored in Ben's OneDrive account which the virtual assistant was able to access) is immediately or is very quickly following the request shared with the meeting participants (here at a fourth time 822 that still shows 12:40 PM), via viewscreen 505. Thus, the data was very handily retrievable by a user. In this case, even though the user did not bring their own personal computing device, there was no need to rely on having access to their own physical computing device, trying to connect their own device to the shared room display, or asking another user to log out of their account so that they might log in and search for the desired document.

Figure 9A:
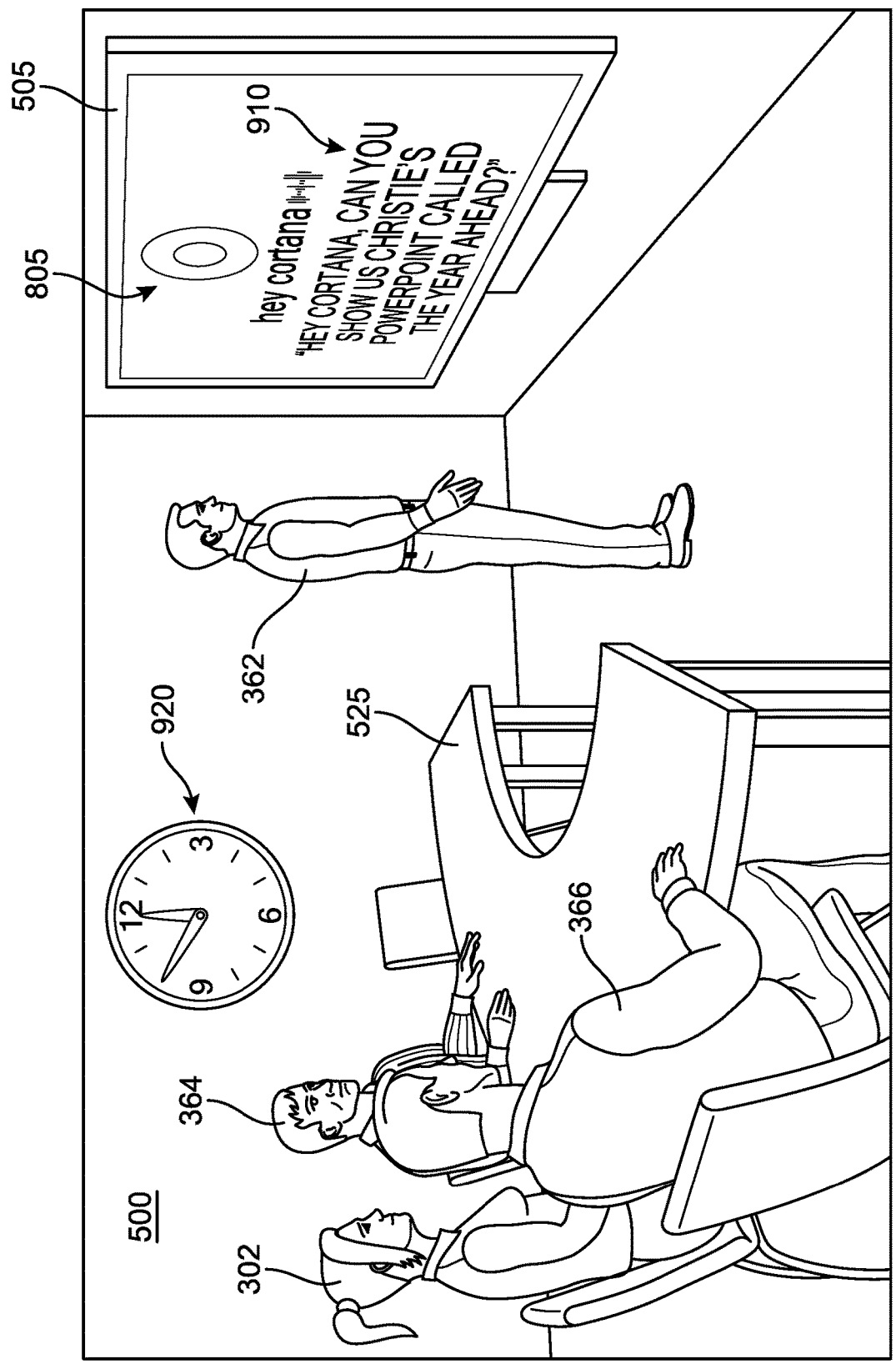
FIGS. 9A and 9B illustrate an implementation of a meeting event during which a second user requests a presentation of another user's data and is provided access to the requested data object.
Figure 9B:
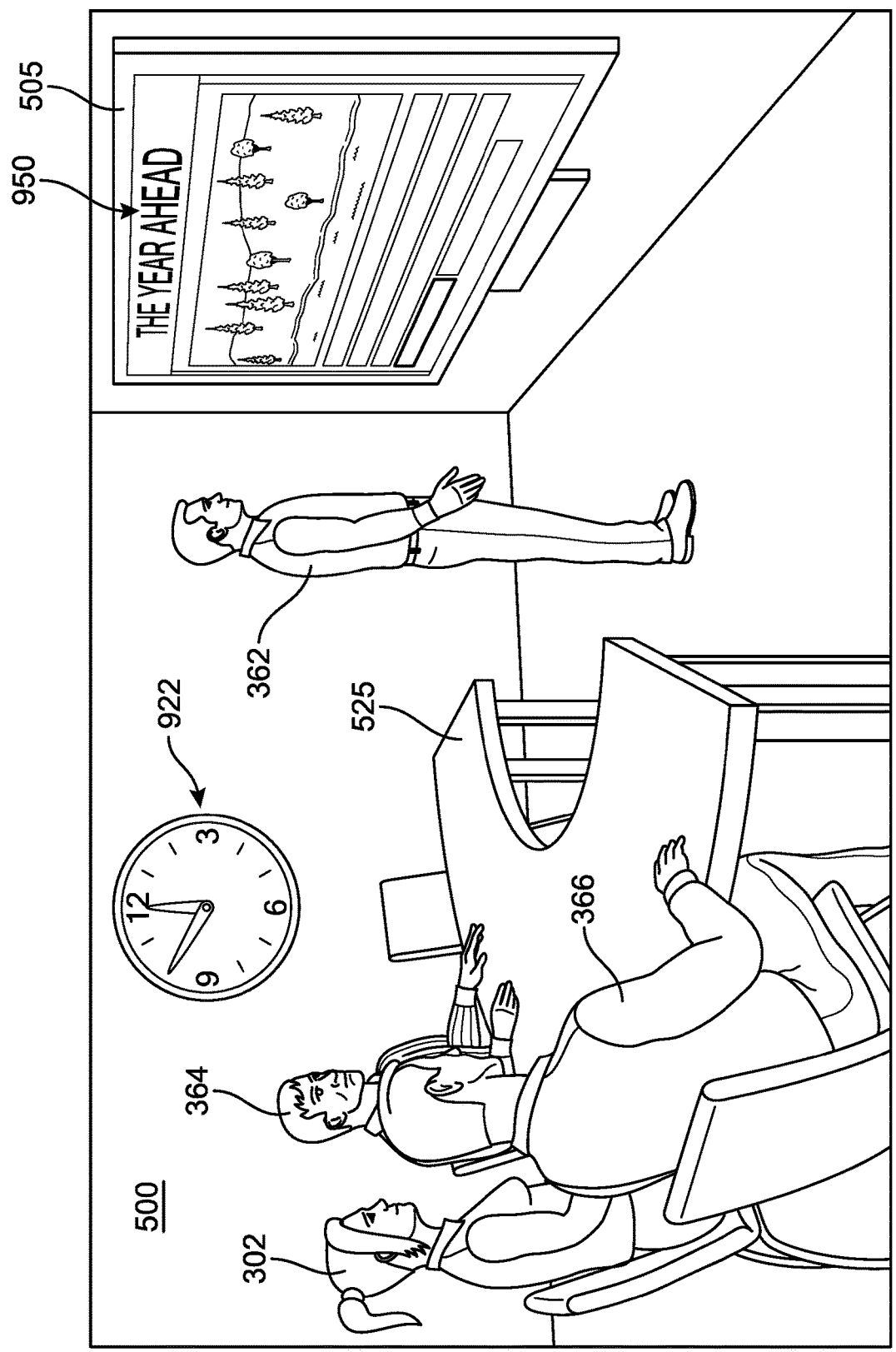

Following the request by 'Ben' and the response by the virtual assistant in FIGS. 8A and 8B, other participants may wish to view other information. In FIG. 9A, the first participant 362 ("Jason"), at a fourth time 920 (12:50 PM), voices a second request 910 for another electronic content item via the virtual assistant 805 that is part of the organizer's 302 own data ("Hey Cortana, can you show us Christie's PowerPoint called The Year Ahead?"). As seen earlier in FIG. 3, the organizer 302 opted to allow attendees to the meeting to access her data. In this case, the first participant's request can be recognized by the virtual assistant as (a) belonging to a person attending the meeting ('Jason') and (b) belonging to someone other than the person whose data is being targeted. Because the organizer 302 has authorized this type of interaction with her data, the second request 910 is valid. Thus, as illustrated in FIG. 9B, the virtual assistant can immediately communicate with the organizer's data storage sites and locate the designated file or content item. As shown in FIG. 9B, a second requested content item 950 (here a PowerPoint stored in Christie's OneDrive account) is immediately or is very quickly following the second request shared with the meeting participants. Thus, at a sixth time 922 that still shows 12:50 PM), the group can enjoy convenient and simplified access to the desired data object via the viewscreen 505. In other words, the data was very handily retrievable by a user that did not 'own' the data because the owner had provided permission for such a process in advance of the meeting.

Figure 10A:
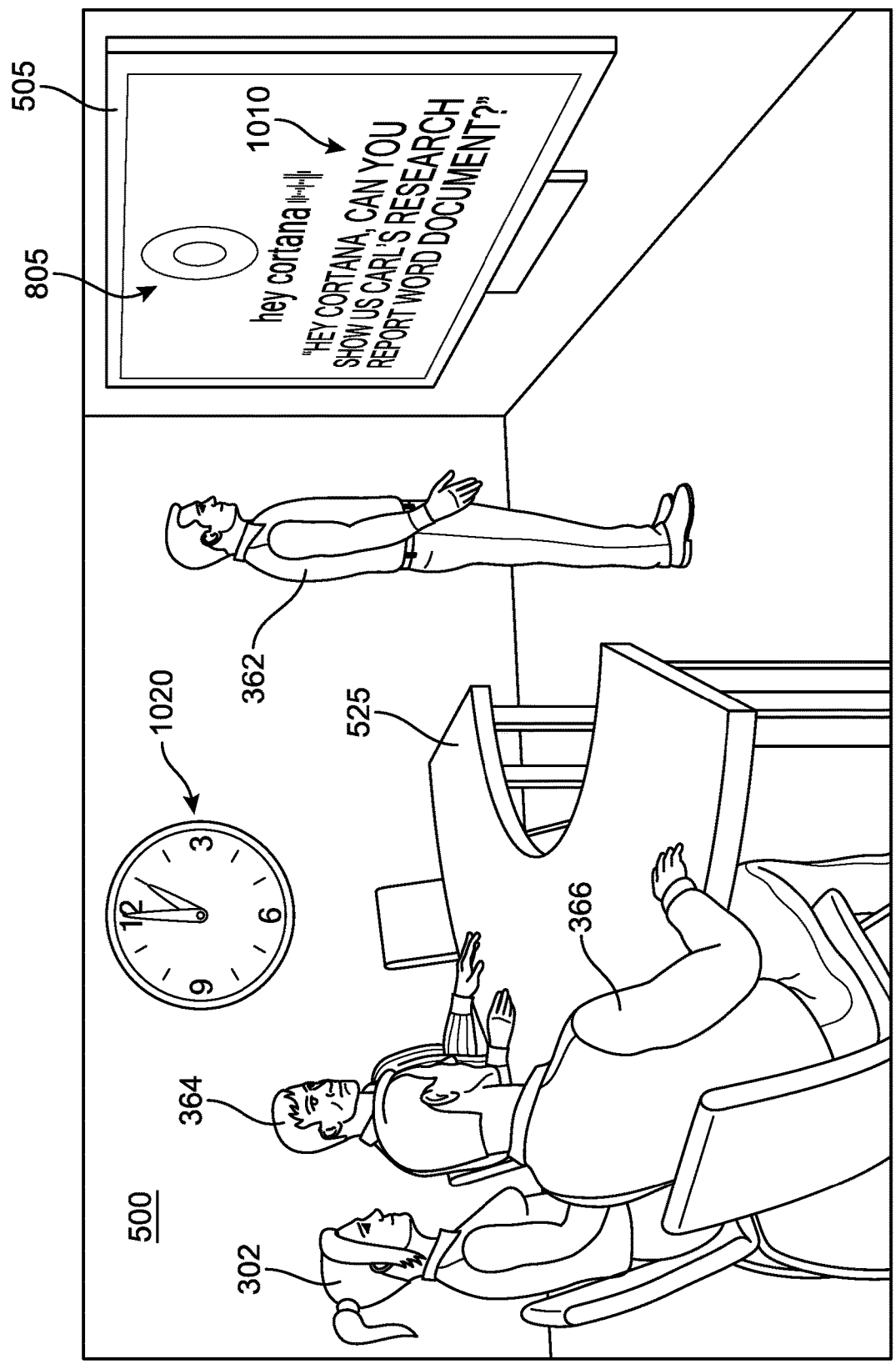
FIGS. 10A and 10B illustrate an implementation of a meeting event during which a second user requests a presentation of another user's data and is denied access to the requested data object.
Figure 10B:
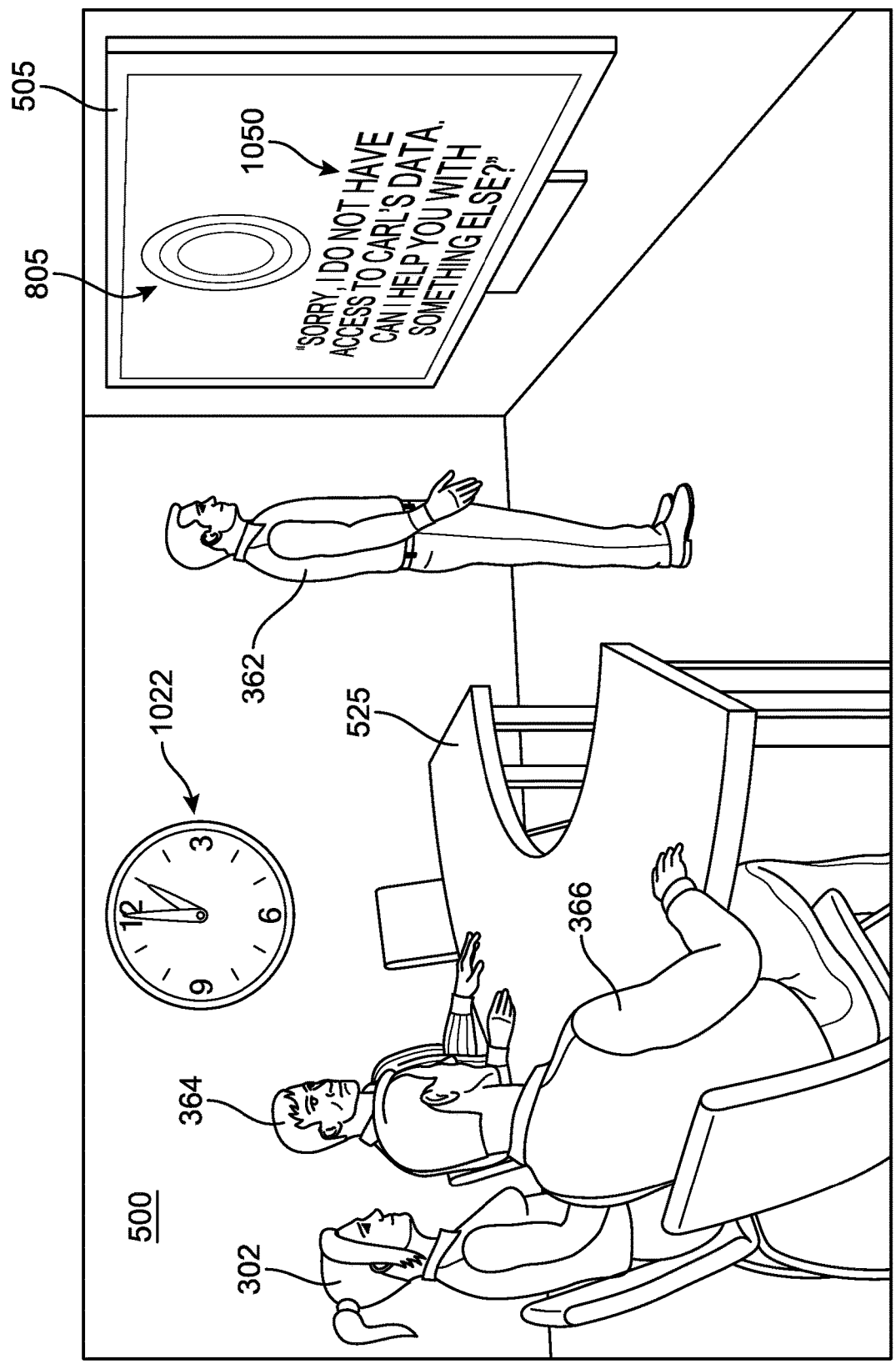

However, as noted earlier, in some implementations, a user may decline such access. For example, following the request by 'Jason' and the response by the virtual assistant in FIGS. 9A and 9B, additional information may be requested. In FIG. 10A, the organizer 302 ("Christie"), at a sixth time 1020 (1:00 PM), submits a third request 1010 for a specific electronic content item via the virtual assistant 805 ("Hey Cortana, can you show us Carl's Research Report word document?"). As noted earlier with respect to FIG. 8A, the second participant 364 ("Carl") elected not to authorize the temporary data access. In this case, the organizer's request can be recognized by the virtual assistant as (a) belonging to a person attending the meeting ('Christie'), (b) belonging to someone other than the person whose data is being targeted (Carr), and (c) the person whose data is being targeted has not authorized temporary data access. Because the second participant 364 has not authorized this type of interaction with his data, the third request 1010 is valid. Thus, as illustrated in FIG. 10B, immediately following the request—at a seventh time 1022 (1:00 PM)—the virtual assistant responds by denying the request. This is represented by a virtual assistant response 1050 ("Sorry, I do not have access to Carl's data. Can I help you with something else?") that is shared with the meeting participants. The second participant 364 can independently or manually access his data if so desired, but the system is unable to act on his behalf to access the data in this case.

Figure 11:
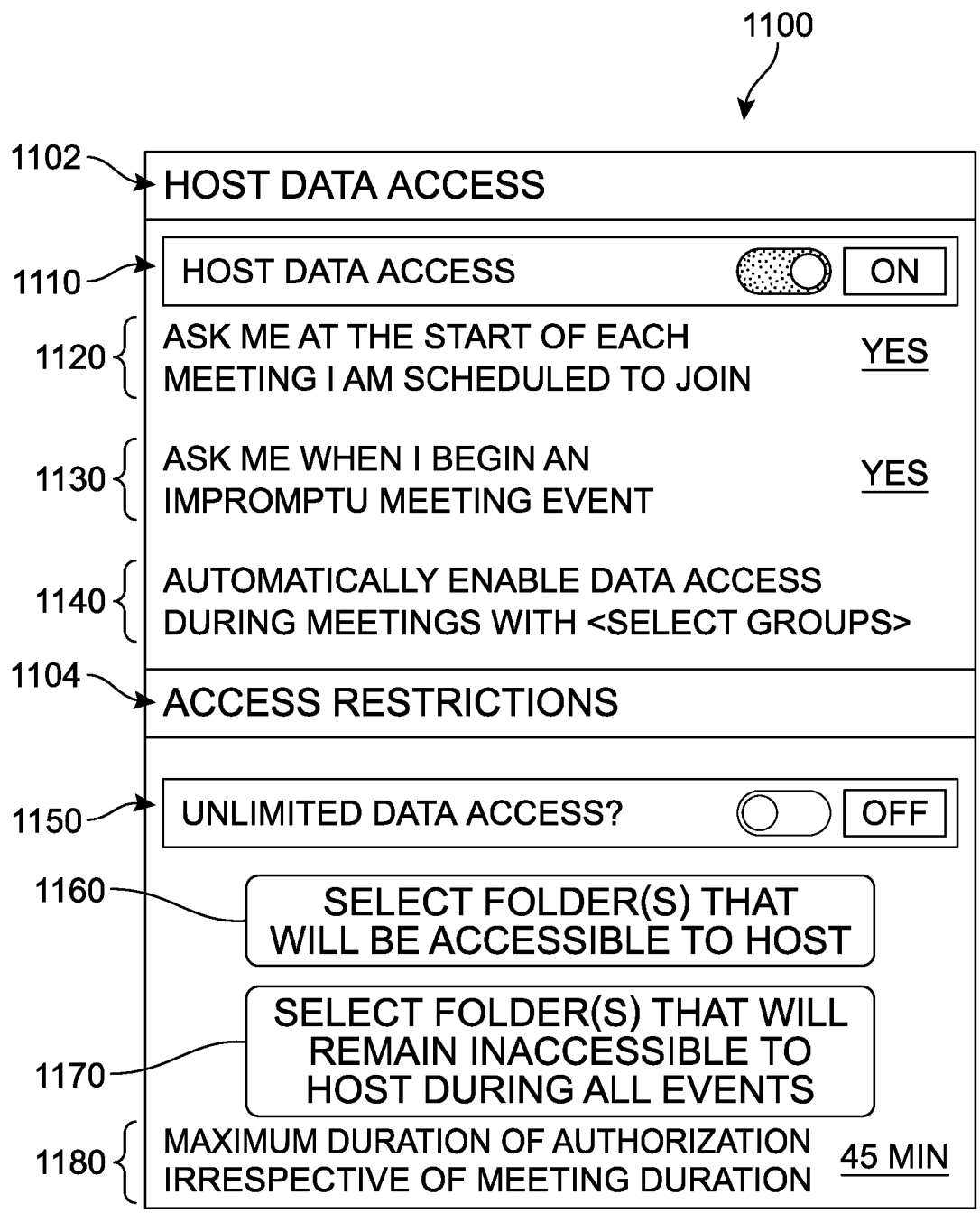
FIG. 11 is an implementation of a general settings interface for modifying the temporary data access feature.

As noted above, in different implementations, the system may include provisions for adjusting, modifying, customizing, or otherwise specifying their preferred temporary data access. In FIG. 11, one example of a general settings interface 1100 is shown presenting a plurality of selectable options to a user. In this example, the settings user interface 1100 includes a first portion labeled "General" 1102, and a second portion labeled "Access Restrictions" 1104. In other implementations, alternative or additional functions and options may be provided for the user to configure, and the appearance of the user interface can vary widely from what is shown here, while still providing users the ability to personalize or 'tweak' the operation of the temporary access feature. A few of these adjustable preferences will be described now with reference to FIG. 11.

In some implementations, the system can be configured to receive input from a user turning on or off the feature itself. In other words, the user interface may provide a means by which a user can request that no prompts be provided regarding this feature (OFF), or that such prompts are allowed (ON). Thus, a user can completely opt-out of the temporary access requests that are submitted from organizers or during their own impromptu meetings. In FIG. 11, the user has elected to enable a first category 1110 "HOST DATA ACCESS". In response, additional options are also made available, including a first option 1120, a second option 1130, and a third option 1140. Each option allows a user to configure the implementation of the temporary access feature. For example, if the first option 1120 ("Ask me at the start of each meeting I am scheduled to join") is activated, the user will be shown a prompt whenever they are approaching a scheduled meeting time that asks if they would like to authorize the temporary data access. In addition, if the second option 1130 ("Ask me when I begin an impromptu meeting event") is activated, if the system determines that a user has initiated or joined a meeting that was not previously scheduled or otherwise on the user's calendar, the user will be shown a prompt whenever they are approaching a scheduled meeting time that asks if they would like to authorize the temporary data access. In some other implementations, the user can bypass the per-meeting authorization prompts for specified events. For example, if the third option 1140 ("Automatically enable data access during meetings with <Select Groups>") is activated, the system can be configured to automatically grant the virtual assistant temporary access to the user's data during any meeting that occurs with any of the selected groups. In some implementations, the user can select all groups or subsets of a group such as a listing of a smaller set of individual persons.

In some implementations, the user may wish to identify one or more restrictions or conditions that should be applied when the feature is enabled. In FIG. 11, the second portion 1104 includes a fourth option 1150, a fifth option 1160, a sixth option 1170, and a seventh option 1180. In this example, if the fourth option 1150 ("Unlimited Data Access?") is activated, then subsequent data access sessions (e.g., during a meeting) will default to a full access of the user's account and data. In this case, the fourth option 1150 has been turned OFF, and additional options have been made available. The fifth option 1160 provides an opportunity for the user to specify the folders or data storage sites or applications that would be made accessible to the virtual assistant when authorization is granted. The sixth option 1170 can allow a user to specify folders or data storage sites or applications that should never be made accessible to the virtual assistant when authorization is granted. Thus, if the user at a later time attempts to grant access to an 'off-limits' folder, the system will deny access and notify the user that they have identified such a folder as being blocked from use with this feature. The user can then return to the general settings interface 1100 and modify the selected folders if they wish. Finally, in some implementations, the system can be configured to receive input from a user specifying a time limit over which the feature can be enabled without interruption via the seventh option 1180 ("Maximum duration of authorization irrespective of meeting duration"). If a meeting event runs over or otherwise exceeds the time limit specified (e.g., 45 minutes) the system will no longer allow the virtual assistant the temporary data access, and can be configured to require the user to re-authorize the temporary access in order to proceed.

Figure 12:
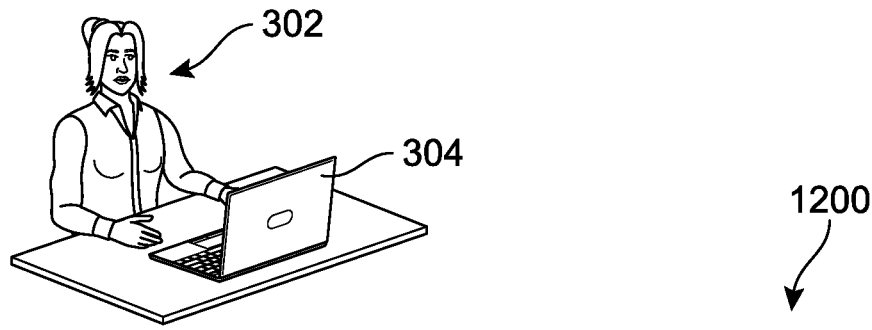
FIG. 12 is an implementation of a recurring meeting invitation interface including options for modifying the temporary data access feature.

In different implementations, a user may be provided with more data access options during the meeting invitation creation process. For purposes of illustration, FIG. 12 depicts a meeting invite interface 1200 in which logistical details 1234 for a recurring meeting event 12 are being inputted. In this case, the organizer 302 may wish to establish a policy that applies to all of the meeting instances that will occur as part of the recurring series. As an example, a data access section 1244 is provided within the larger meeting invite interface 1200 by which the organizer 302 can request implementation of the temporary data access feature for this set of meetings, as well as the opportunity to identify folders that are to be made accessible to the virtual assistant (host) during each meeting.

Figure 13:
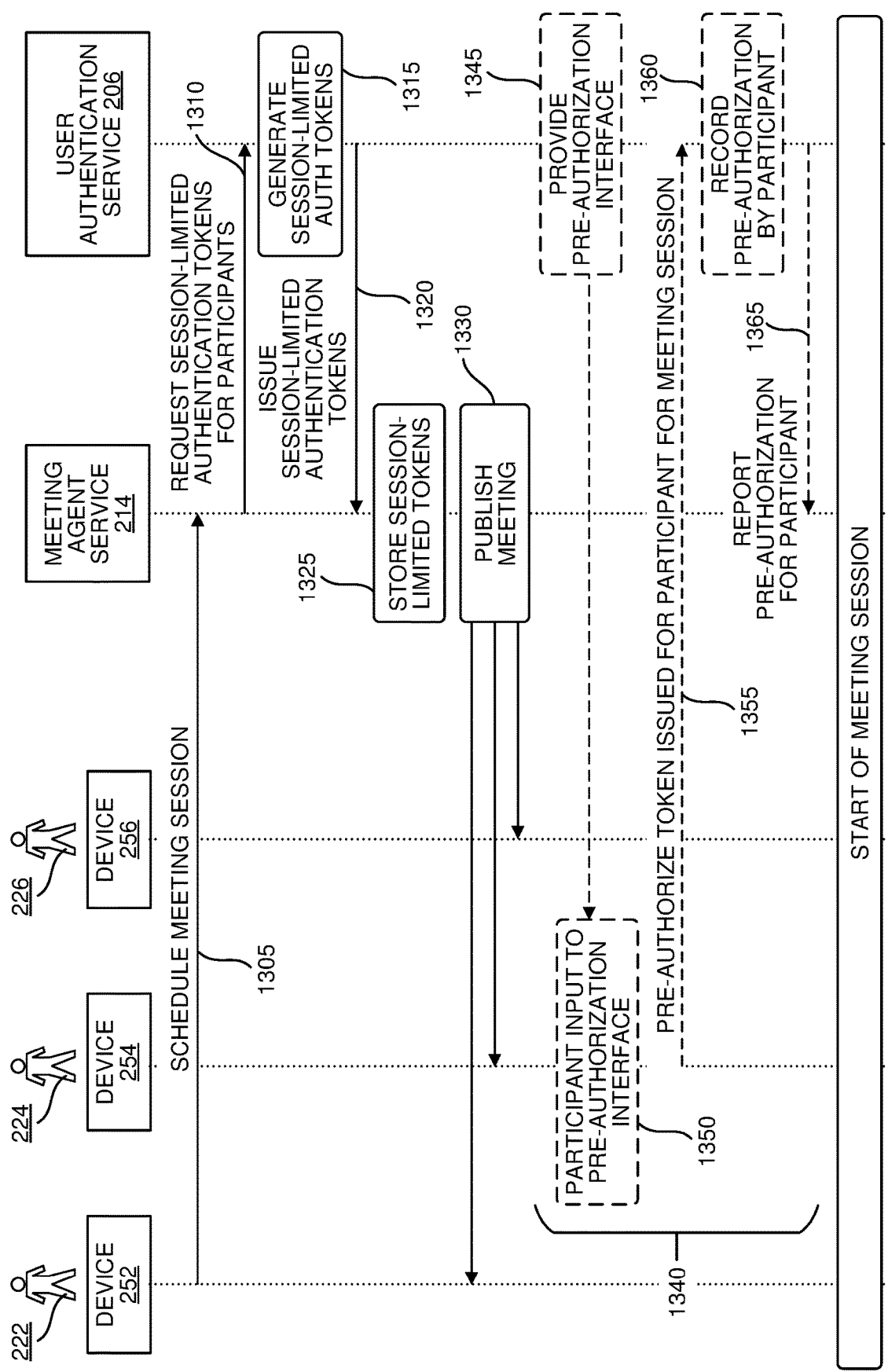
FIGS. 13-17 are a process flow diagram of an implementation for establishing access between a virtual assistant and a user's data during an activity or event.

In order to further the reader's understanding of the proposed systems, a schematic flow diagram depicting one implementation of the system is illustrated in FIGS. 13-17. FIG. 13 presents a scenario in which the first participant 222 acts as an organizer for the meeting session 240 as described in connection with FIG. 2. In an operation 1305 the first participant 222 makes use of the computing device 252 to schedule the meeting session 240 via the meeting agent service 206. In response, in an operation 1310, the meeting agent service 206 requests, from the user authentication service 214, session-limited authentication tokens for the participants 220 identified by the first participant 222 in the operation 1305. It is noted that FIGS. 13-17, the term "token" is interchangeable with "credential." In response to the request made in operation 1310, in an operation 1315, the user authentication service 214 generates one or more session-limited authentication tokens for the meeting session 240 and for the participants 220 identified for the meeting session 240. In some implementations, a separate token will be generated for each of the participants. In other implementations, a single token may be generated for the meeting session 240, rather than individual per-participant tokens. In an operation 1320, in response to the request at operation 1310, the user authentication service 214 issues the session-limited authentication tokens generated at operation 1315 to the meeting agent service 206. In an operation 1325, the meeting agent service 206 stores the session-limited authentication tokens received in the operation 1320. Also, in an operation 1330, the meeting agent service 206 publishes the meeting session 240 to the participants 220, including the first participant 222 that organized the meeting session 240, the second participant 224 (for example, via the computing device 254), and the third participant 226 (for example, via the computing device 256).

In some examples, an optional pre-authorization stage 1340 may be performed by one or more of the participants 220; in FIG. 13 the second participant 224 will be shown as performing the pre-authorization stage 1340. The pre-authorization stage occurs before the meeting session 240 begins. In some examples, the second participant 224 may perform an action via the computing device 254 to invoke a pre-authorization interface. In some implementations, the pre-authorization interface is provided by the user authentication service 214 at an operation 1345. For example, the user authentication service 214 may present the pre-authorization interface in the form of a webpage presented via a web browser application or chromeless panel on the computing device 254. In another example, the user can perform pre-authorization via the meeting invitation as it is generated or received (see FIGS. 3 and 4 above). In an operation 1350 the second participant 224 provides input to the pre-authorization interface, thereby issuing a command at an operation 1355 to pre-authorize a token issued for the second participant 224 for the meeting session 240. In response to this command, in an operation 1360, the user authentication service 214 records the pre-authorization by the second participant 224. This record may include additional details, such as per-participant authorization. Also, the user authentication service 214 in an operation 1365 reports the pre-authorization of the token issued for the second participant 224. This report indicates that the token has been pre-authorized, but the token can still not be used until it later becomes enabled or otherwise active during the meeting session 240 or a period of time directly associated with the meeting session 240. It should be understood that the pre-authorization stage 1340 is optional and users may instead proceed directly to a meeting and authorize a token during or immediately prior to the meeting time (see FIGS. 6A and 6B). in some implementations, the pre-authorization stage and the later authentication can both be utilized to pre-configure the system to match the user's own preferences in advance.

Figure 14:
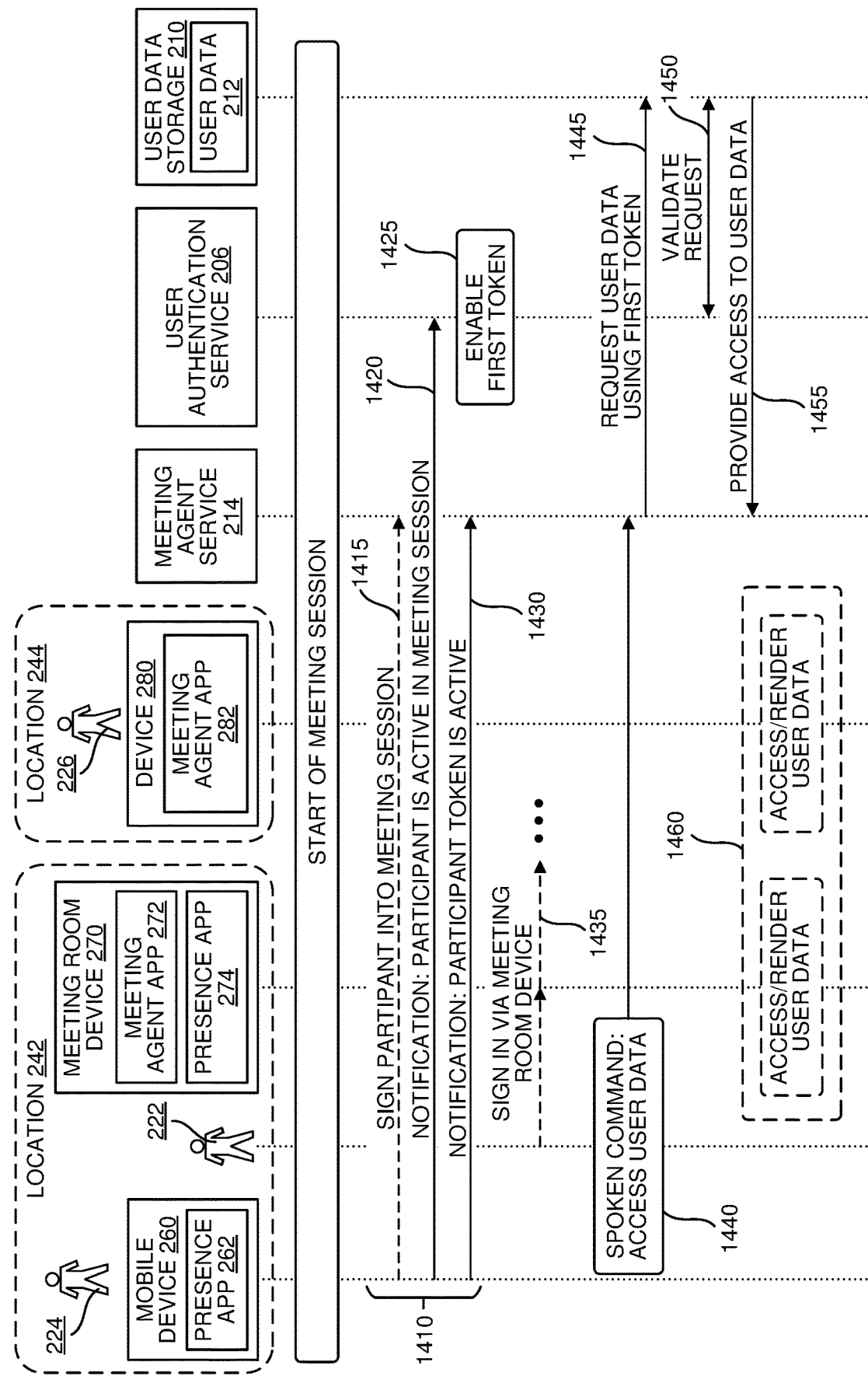

Continuing from the example shown in FIG. 13, FIG. 14 presents an example in which the user data 212 hosted by the user data service 210 is accessed by the meeting agent service 206 using the session-limited authentication tokens it was issued in operation 1320. In some examples, as shown in FIG. 14, a set of operations 1410 is performed by the presence application 262 after the meeting session 240 has started to notify the system 200 that the second participant 224 is actively participating in the meeting session 240. The set of operations 1410 may include an operation 1415 in which the presence application 262 signs the second participant 224 into the meeting session 240. In some implementations, in response to the operation 1415, the meeting agent service 206 may perform a corresponding sign-in action for the second participant 224 with the meeting communication service 202 (see FIG. 2). It should be understood that operation 1415 is optional. The set of operations 1410 includes an operation 1420 in which the presence application 262 notifies the user authentication service 214 that the second participant 224 is actively participating in the meeting session 240.

In response to the notification received in the operation 1420, at an operation 1425, the user authentication service 214 enables a first token included in the tokens generated at operation 1315 and associated with the second participant 224. As mentioned in connection with the operation 1315, the first token may be one of multiple per-participant tokens generated for the meeting session 240 or a single token generated for the meeting session 240 (in which case, a per-participant flag or value may be changed to reflect that the single token is enabled with respect to the second participant 224). Additionally, the set of operations 1410 includes an operation 1430 of sending a notification to the meeting agent service 206 that the first token for the second participant 224 is enabled, which may be recorded by the meeting agent service 206. In some examples, as shown in FIG. 14, the notification may be performed by the presence application 262. In other examples, the notification may instead be provided by the user authentication service 214. Although not illustrated as discrete operations, FIG. 14 also illustrates that a set of operations 1435 is similarly performed to indicate to the system 200 that the first participant 222 is also actively participating in the meeting session 240, resulting in a similar enabling of a second token (not illustrated in FIG. 14).

In an operation 1440 occurring after the set of operations 1410, the first participant 222 issues the spoken command 266 requesting that the user data 212 be accessed by the meeting agent service 206. In response to this command, at an operation 1445, the meeting agent service 206 requests access to the user data 212 from the user data service 210 using the first token that was enabled in the operation 1425. In response to this request, at an operation 1450, the user data service 210 validates the first token received at the operation 1445 to authenticate the meeting agent service 206 for authorization of the request for the user data 212. Because the first token was enabled at the operation 1425 and remains enabled, the user authentication service 214 indicates to the user data service 210 that the first token is valid. Accordingly, at an operation 1455, the user data service 210 provides the meeting agent service 206 with the requested access to the user data 212. In the example shown in FIG. 14, the meeting agent service 206, at an operation 1460, causes the user data 212 to be rendered at the first location 242 and the second location 244. For example, the meeting agent service 206 may request a content of the user data 212 and deliver the content to the meeting room device 270 to be rendered by the meeting room device 270.

Although not specifically shown in FIG. 14, in this example, the third participant 226 has not performed an operation or set of operations similar to the set of operations 1410, and accordingly the system 200 has not been notified that the third participant 226 is actively participating in the meeting session 240. As a result, if one of the participants 220 were to issue a spoken command for user data requiring authentication of the third participant 226, a session-limited token created by the user authentication service 214 for that purposes would remain disabled and the command would be ineffective. Although above is described an example in which the first token was enabled in response to the operations 1410 performed via the presence application 262, in some implementations and/or under various circumstances, the user authentication service 214 may automatically enable the first token at or about a start time previously identified for the meeting session 240 such as during the initial scheduling of the meeting session 240 described in connection with the operation 1305 in FIG. 13.

Figure 15:
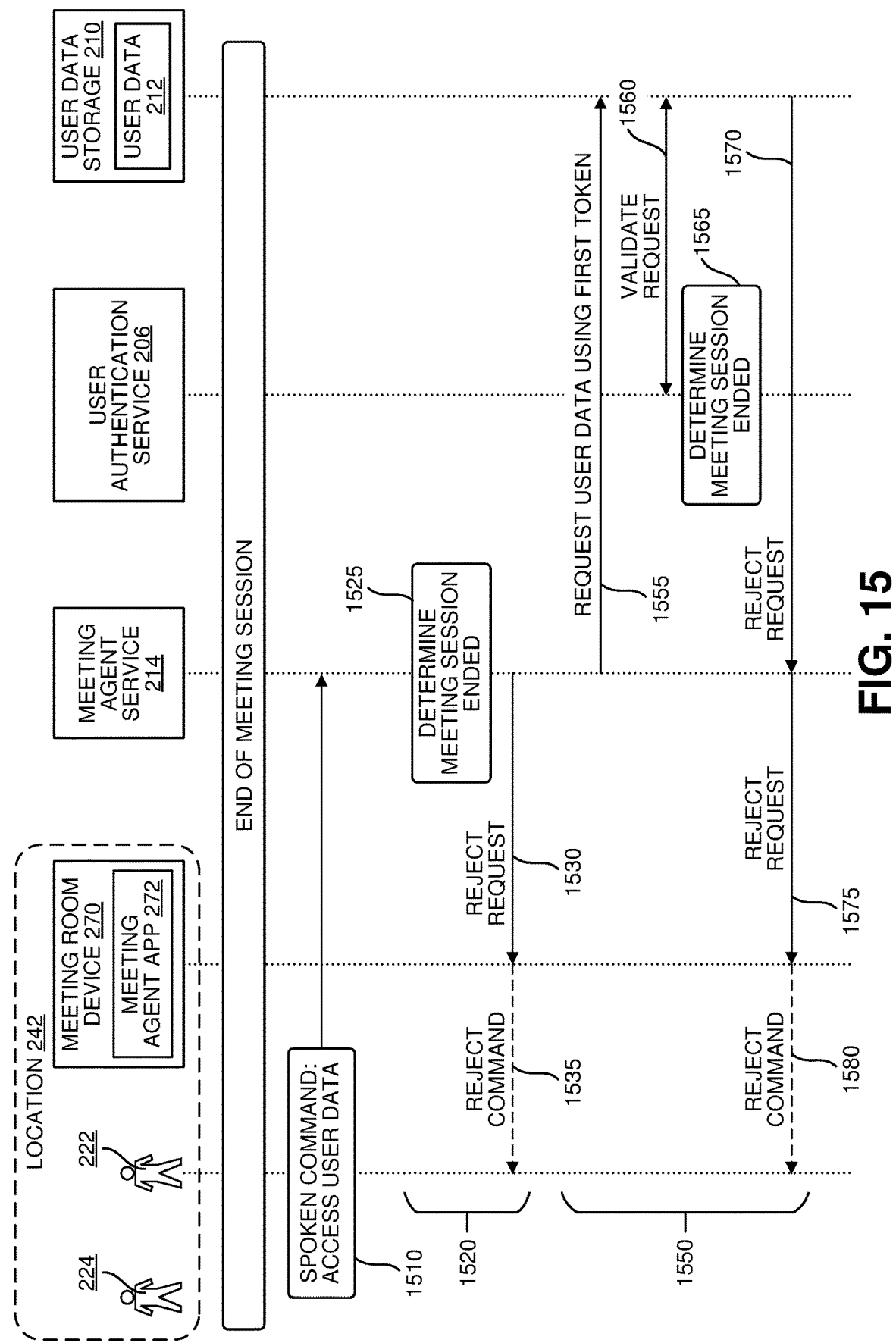

Continuing the example of FIG. 14, FIG. 15 illustrates an attempt to access the user data 212 after the meeting session 240 has ended. In an operation 1510 occurring after the end of the meeting session 240, the first participant 222 issues the spoken command 266 requesting that the user data 212 be accessed by the meeting agent service 206. FIG. 15 illustrates two alternative sets of operations in response to the command issued in the operation 1510 in which the system 200 responds to, and ultimately rejects, the command due to the meeting session 240 having ended. In a first set of operations 1520, the meeting agent service 206, in an operation 1525, determines that the meeting session 240 has ended. For example, the meeting agent service 206 may determine that a current time is after a recorded end time for the meeting session 240, although other approaches may be used to make this determination. In response to the determination made in the operation 1525, at an operation 1530, the meeting agent service 206 rejects the command issued in the operation 1510, which may be communicated to the first participant 222 in an operation 1535 (for example, by a verbal response rendered by the meeting device 270).

In an alternative second set of operations 1550, at an operation 1555, the meeting agent service 206 instead requests access to the user data 212 from the user data service 210 using the first token that was enabled in the operation 1425, much as previously described for the operation 1445. In response to this request, at an operation 1560, the user data service 210 attempts to validate the first token received at the operation 1555 to authenticate the meeting agent service 206 for authorization of the request to access the user data 212, much as previously described for the operation 1450. However, at an operation 1565, the user authentication service 214 determines that the meeting session 240 has ended, and as a result indicates to the user data service 210 that the first token is invalid. As a result, at an operation 1570, the user data service 210 rejects the request received from the meeting agent service 206 at the operation 1555. Accordingly, at an operation 1575 the meeting agent service 206 rejects the command issued at the operation 1510 much as in the operation 1530, which may be communicated to the first participant 222 in an operation 1580 (for example, by a verbal response rendered by the meeting device 270).

It is understood that operations similar to those described for the operation sets 1520 and/or 1550 may also occur for a spoken command issued before the meeting session 240 begins, due to the command occurring outside of the context permitted by the first token (the duration of the meeting session 240). By use of the techniques shown in FIG. 16, authorization granted by the second participant 224 will be temporary, and the ability of other participants 220 or the meeting agent service 206 to access the user data 212 will automatically terminate at the close of the meeting session 240 and/or not be permitted in advance of the meeting session 240.

Figure 16:
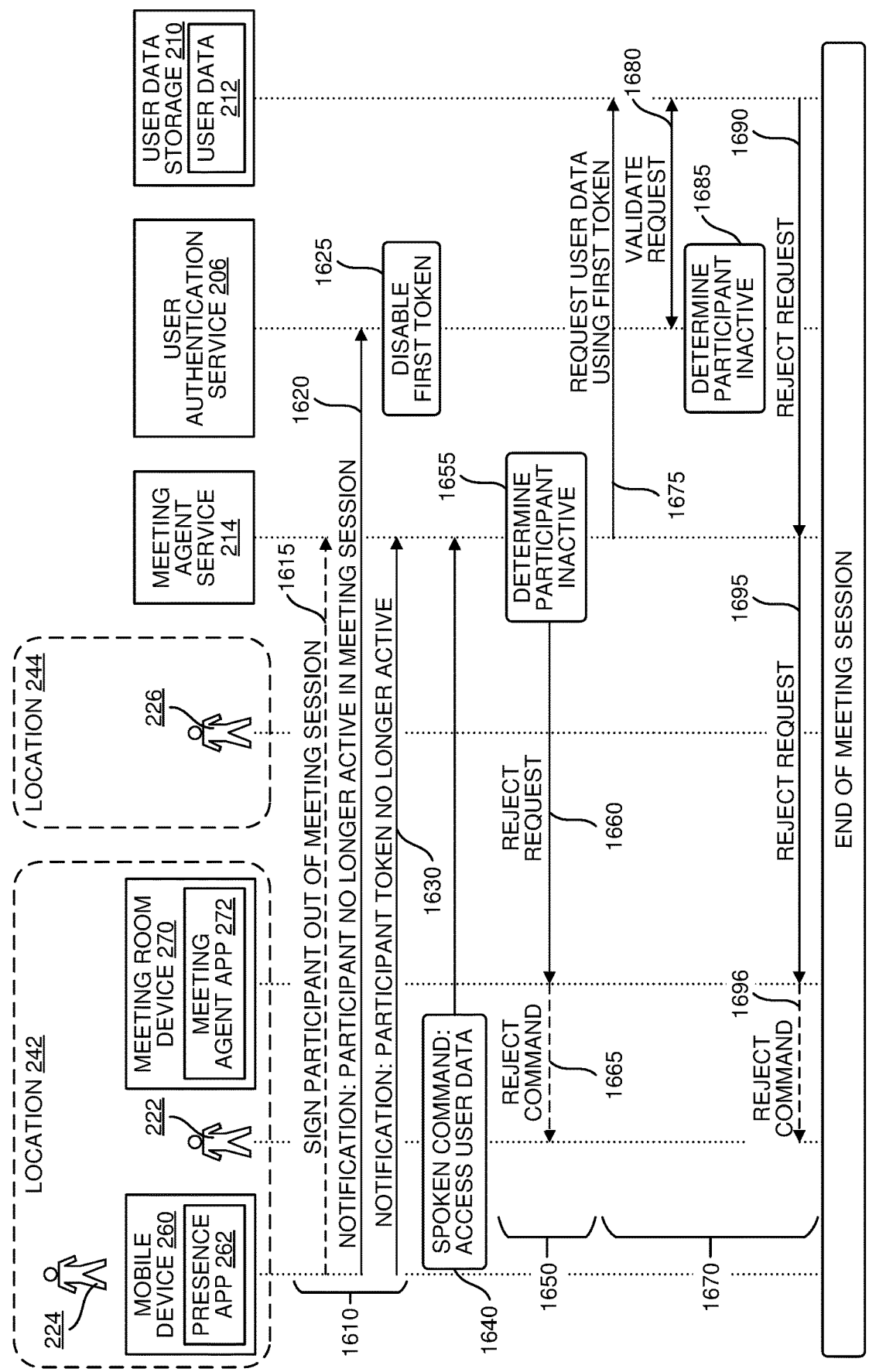

Continuing the example of FIG. 14, FIG. 16 illustrates an example in which an attempt is made to access the user data 212 during the meeting session 240, but the attempt is rejected due to an associated participant no longer actively participating in the meeting session 240. In some examples, as shown in FIG. 14, a set of operations 1610 is performed by the presence application 262 before the meeting session 240 has ended to notify the system 200 that the second participant 224, who was previously actively participating in the meeting session 240, is no longer actively participating in the meeting session 240. The set of operations 1610 may include an operation 1615 in which the presence application 262 signs the second participant 224 out of the meeting session 240. In some implementations, in response to the operation 1615, the meeting agent service 206 may perform a corresponding sign-out action for the second participant 224 with the meeting communication service 202 (see FIG. 2). It should be understood that operation 1615 is optional. The set of operations 1610 includes an operation 1620 in which the presence application 262 notifies the user authentication service 214 that the second participant 224 is no longer actively participating in the meeting session 240.

In response to the notification received in the operation 1620, at an operation 1625, the user authentication service 214 disables the first token previously enabled in the operation 1425 (see FIG. 14). As mentioned in connection with the operations 1315 and 1425, the first token may be one of multiple per-participant tokens generated for the meeting session 240 or a single token generated for the meeting session 240 (in which case, a per-participant flag or value may be changed to reflect that the single token is disabled with respect to the second participant 224). Additionally, the set of operations 1610 includes a operation 1430 of sending a notification to the meeting agent service 206 that the first token for the second participant 224 is disabled, which may be recorded by the meeting agent service 206. In some examples, as shown in FIG. 16, the notification may be performed by the presence application 262. In other examples, the notification may instead be provided by the user authentication service 214.

In an operation 1640 occurring after the operation 1625 and before the end of the meeting session 240, the first participant 222 issues the spoken command 266 requesting that the user data 212 be accessed by the meeting agent service 206. Similar to FIG. 15, FIG. 16 illustrates two alternative sets of operations in response to the command issued in the operation 1640 in which the system 200 responds to, and ultimately rejects, the command due to the second participant 224 no longer actively participating in the meeting session 240. In a first set of operations 1650, the meeting agent service 206, in an operation 1655, determines that the second participant 224 is not actively participating in the meeting session 240 based on the notification received in the operation 1630. In response to the determination made in the operation 1655, at an operation 1660, the meeting agent service 206 rejects the command issued in the operation 1640, which may be communicated to the first participant 222 in an operation 1665 (for example, by a verbal response rendered by the meeting device 270).

In an alternative second set of operations 1670, at an operation 1675, the meeting agent service 206 instead requests access to the user data 212 from the user data service 210 using the first token that was enabled in the operation 1425, much as previously described for the operations 1445 and 1555. In response to this request, at an operation 1680, the user data service 210 attempts to validate the first token received at the operation 1675 to authenticate the meeting agent service 206 for authorization of the request to access the user data 212, much as previously described for the operations 1450 and 1560. However, at an operation 1685, the user authentication 214 determines that the second participant 224 is no longer actively participating in the meeting session 240 based on the first token having been disabled in the operation 1625, and as a result indicates to the user data service 210 that the first token is invalid. As a result, at an operation 1690, the user data service 210 rejects the request received from the meeting agent service 206 at the operation 1675. Accordingly, at an operation 1695 the meeting agent service 206 rejects the command issued at the operation 1640 much as in the operation 1660, which may be communicated to the first participant 222 in an operation 1696 (for example, by a verbal response rendered by the meeting device 270).

By use of the techniques shown in FIG. 16, the second participant 224 is provided confidence that in the event that the second participant 224 leaves the meeting session 240 before a pre-scheduled end time or other end of the meeting session 240, other participants of the meeting session 240 will not have access to the user data 212 in the absence of the second participant 224. It is noted that in some examples, the second participant 224 may rejoin the meeting session 240 before it ends, in response to which the system 200 may reenable the first token much as previously discussed in FIG. 15.

Figure 17:
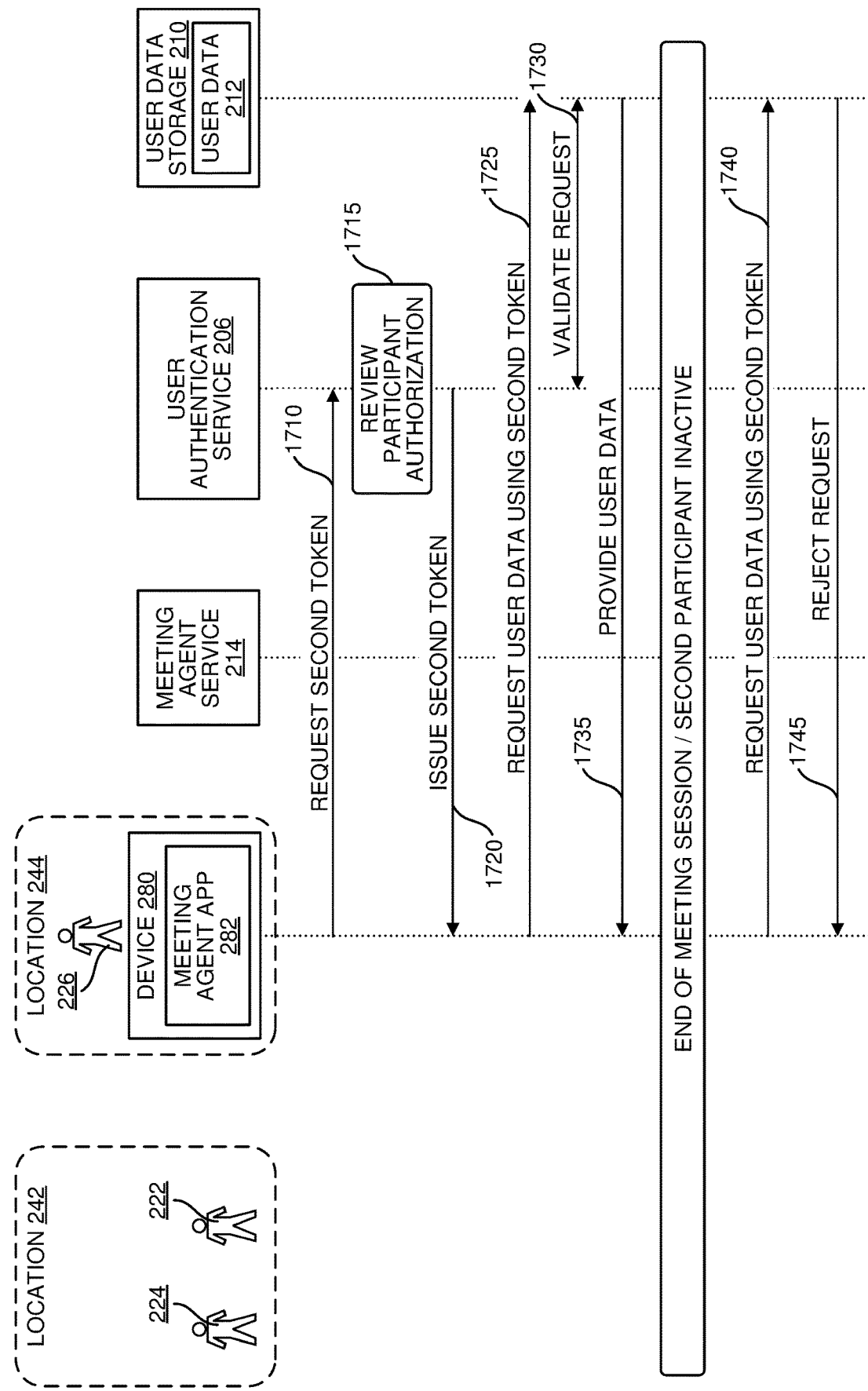

Continuing the example of FIG. 14, FIG. 17 illustrates an example in which a computing device associated with a participant 220, rather than the meeting agent service 206, makes use of the system 200 to obtain session-limited authentication for accessing the user data 212. In this example, the computing device 280 associated with the third participant 226 at the second location 244 attempts to access the user data 212. At an operation 1710, the computing device 280, in some examples via the meeting agent application 282, requests at least a second token from the user authorization service 214, much as described for the operation 1310 (see FIG. 13). In some examples, one or more new session-limited tokens may be generated by the user authentication service 214, much as described for the operation 1315. In some examples, the user authentication service 214 may provide one or more of the same tokens provided to the meeting agent service 206. In some examples, the request includes information that may be used to identify the user data 212 and/or the second participant 224, and the information applied by the user authentication service 214 to select or generate one or more tokens. In some examples, the request identifies the third participant 226. At an optional operation 1715 the user authentication service 214 reviews details of an authorization granted by the second participant 224 based on information included in or determined based on the request to determine whether to provide the second token and/or determine particular limitations to be applied in connection with the second token (for example, the authorization may limit the third participant 226 to read-only access). It is noted that different levels of authorization may be specified and/or applied for tokens issued to the meeting agent service 206 versus tokens issues to other systems and devices (such as the computing device 280, in this example). In an operation 1720, in response to the request at operation 1710, the user authentication service 214 issues the second token to the computing device 280.

At an operation 1725, the computing device 280 requests access to the user data 212 from the user data service 210 using the second token issued and received in the operation 1720. In response to this request, at an operation 1730, the user data service 210 validates the second token received at the operation 1730 to authenticate the computing device 280 for authorization of the request for the user data 212. At the time of the operation 1730 the user authentication service 214 determines the second token is currently valid and indicates to the user data service 210 that the second token is valid. Accordingly, at an operation 1735, the user data service 210 provides the computing device 280 with the requested access to the user data 212. For example, the computing device 280 may request a content of the user data 212 for display and/or editing by an application executed by the computing device 280. Alternatively or in addition to the operations 1725, 1730, and 1735, at an operation 1740 after either the meeting session 240 has ended and/or the second participant 224 is no longer actively participating (see FIG. 16), the computing device 280 requests access to the user data 212 from the user data service 210 using the second token issued and received in the operation 1720. However, due to the meeting session 240 having ended and/or the second participant 224 no longer actively participating, at an operation 1745 the user data service 210, in combination with the user authentication service 214, rejects the request, much as previously described in FIGS. 15 and 16.

Figure 18:
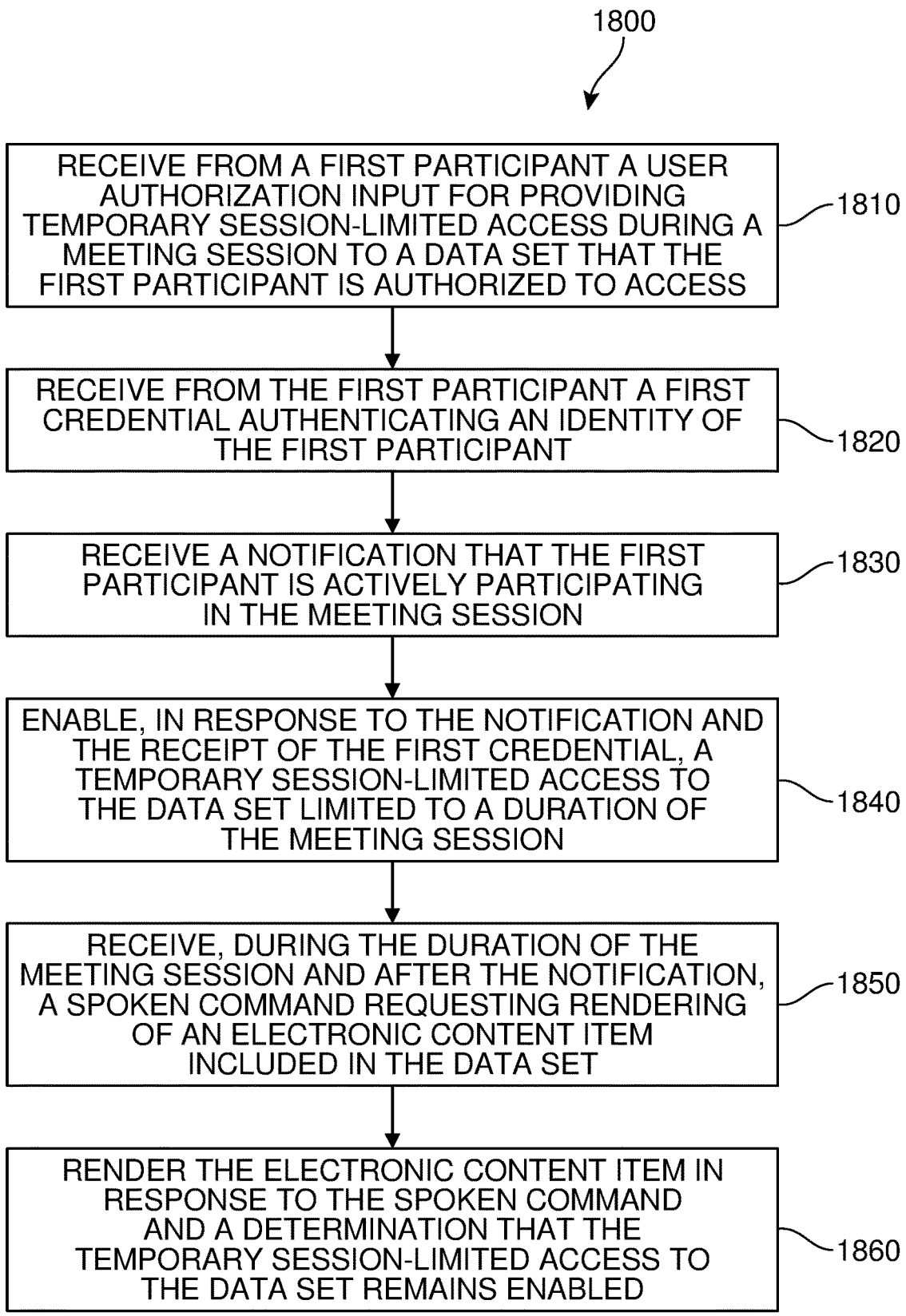
FIG. 18 is a flow diagram illustrating an implementation of an example process for authorizing and enabling session-limited access to user data.

FIG. 18 is a flow diagram illustrating an implementation of an example process 1800 for authorizing and enabling session-limited access to user data. In some examples, some or all of the process 1800 may be performed in combination with any of the features discussed in connection with FIGS. 1A-17. In FIG. 18, a first operation 1810 includes receiving from a first participant a user authorization input for providing temporary session-limited access during a meeting session to a data set that the first participant is authorized to access. In a second operation 1820, the process 1800 includes receiving from the first participant a first credential authenticating an identity of the first participant. In a third operation 1830, the process 1800 includes receiving a notification that the first participant is actively participating in the meeting session. In a fourth operation 1840, the process 1800 includes enabling, in response to the notification and the receipt of the first credential, a temporary session-limited access to the data set limited to a duration of the meeting session. In a fifth operation 1850, the process 1800 includes receiving, during the duration of the meeting session and after the notification, a spoken command requesting rendering of an electronic content item included in the data set. In a sixth operation 1860, the process 1800 includes rendering the electronic content item in response to the spoken command and a determination that the temporary session-limited access to the data set remains enabled.

Furthermore, implementations of the present disclosure can make use of any of the features, systems, components, devices, and methods described in U.S. Pat. No. 9,130,926 to Nori et al., granted Sep. 9, 2015 and titled "Authorization messaging with integral delegation data"; U.S. Patent Publication Number 2014/0337955 to Mendelovich et al., published Nov. 13, 2014 and titled "Authentication and authorization with a bundled token"; U.S. Pat. No. 9,787,654 to Vincent et al., granted Oct. 10, 2017 and titled "Resolving authenticating issues with a second device"; U.S. Patent Publication Number 2013/0160144 to Mok et al., published Jun. 20, 2013 and titled "Entity verification via third-party"; U.S. Patent Publication Number 2010/0269164 to Sosnosky et al., published Oct. 21, 2010 and titled "Online service data management"; U.S. Patent Publication Number 2018/0124068 to Ruhlen et al., published May 3, 2018 and titled "Protocols for accessing hosts"; and U.S. Patent Publication Number 2018/0330274 to Brown et al., published Nov. 15, 2018 and titled "Importing skills to a personal assistant service"; the disclosures of which are each herein incorporated by reference in their entirety.

As a general matter, an example system for management of conference calls can include a conference server (which in some implementations can include more than one server). The server can be located in multiple geographic areas. In addition, the conference server can be connected, often through a firewall, to a wide area network (WAN), such as the Internet. The WAN can be coupled to and accessed through either a wired connection or a wireless local area network (WLAN) that can feature a wireless access point that operates, for example, in accordance with one of the IEEE 802.11 specifications.

In some implementations, the conference server can also be connected to a public switched telephone network (PSTN) via direct inward dialing (DID) trunks or primary rate interface (PRI) trunks. The conference server can also communicate, often through a relay, with a public land mobile network (PLMN), which can also be referred to as a wireless wide area network (WWAN) or a cellular network. In some cases, the PLMN can be configured to be interconnected with or integrated into the PSTN.

In addition, the system can include a number of electronic devices, such as mobile devices and stationary devices. These can include for example, a cellular phone, a smartphone, a tablet, a netbook, a laptop, a PDA (personal digital assistant), or any other device enabled for wireless communication. A mobile device can be equipped for cellular communications through the PLMN, for communications over WAN (accessed, for example, through WLAN by connecting via Wi-Fi to wireless access points) or it can be a dual-mode device capable of both cellular and WAN/WLAN communications. Cellular communications through the PLMN can include voice communications and data communications, and mobile device can support either or both these communication channels.

A mobile device can also include one or more radio transceivers and associated processing hardware and software to enable wireless communications with PLMN, and/or a WLAN via a wireless access point. In different implementations, the PLMN and a mobile device may be configured to operate in compliance with any one or more of a number of wireless protocols, including GSM, GPRS, CDMA, EDGE, UMTS, EvDO, HSPA, 3GPP, LTE, or a variety of others. In addition, a mobile device can roam within PLMN and across PLMNs, in a known manner, as its user moves. In some instances, a dual-mode mobile device and/or the conference server may be configured to facilitate roaming between PLMN and wireless access points, and are thus capable of seamlessly transferring sessions (such as voice calls) from a connection with the cellular interface of a dual-mode device (i.e., mobile device) to a WLAN interface of the dual-mode device, and vice versa.

There may also be a relay that serves to direct communications received over PLMN from a device to the conference server. The relay can also direct communications from the conference server to the mobile device via PLMN. Furthermore, in another implementation, a telephone set (such as a conventional landline telephone) can communicate with the conference server through PSTN.

In different implementations, the conference server can be implemented on one or more servers having suitable communications interfaces for connecting to and communicating with other system components. The conference server can include one or more processors, a memory, and a data interface. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory.

In some implementations, a memory stores user-profile or account information and user preferences for one or more users. The user-profile information can include, for example, a user's name, email address, location data, place of employment, home address, or the like. In addition, the user-profile information can include device information for one or more electronic devices (e.g., one or more mobile or computing devices and/or one or more telephone sets) associated with a user. Device information can include device's phone number (e.g., a cellular phone number or a landline number), a personal identification number (PIN), an IP address, if available, and so forth. In some embodiments, some or all of the user-profile information, including device information, can be retrieved, by the conference server, from the electronic devices. For example, if user-information for a particular electronic device includes device information only for one device associated with the user, and the device information includes only the IP address of the device, the conference server can use the IP information to communicate with the electronic device, for example, via WAN. The conference server can then retrieve from the electronic device additional device information for the device itself (e.g., a cellphone number associated with the device) and/or device information for other electronic devices associated with the same user (e.g., a landline number of the user's telephone set).

In one implementation, the conference server implements the switching to connect session legs and provides the conversion between, for example, a circuit-switched call and a VoIP call, or to connect legs of other media sessions. In some embodiments, in the context of voice calls, the conference server provides a number of additional functions including an automated attendant, interactive voice responses, call forwarding, conference call, or other such features. It can also implement certain usage restrictions on enterprise users, such as blocking international calls or toll free calls. In many embodiments, Session Initiation Protocol (SIP) can be used to set-up, manage, and terminate media sessions for voice calls. Other protocols can also be employed by the conference server, such as Web Services, Computer Telephony Integration (CTI) protocol, Session Initiation Protocol for Instant Messaging and Presence Leveraging Extensions (SIMPLE), and various custom Application Programming Interfaces (APIs).

The detailed examples of systems, devices, and techniques described in connection with FIGS. 1-18 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-18 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 19:
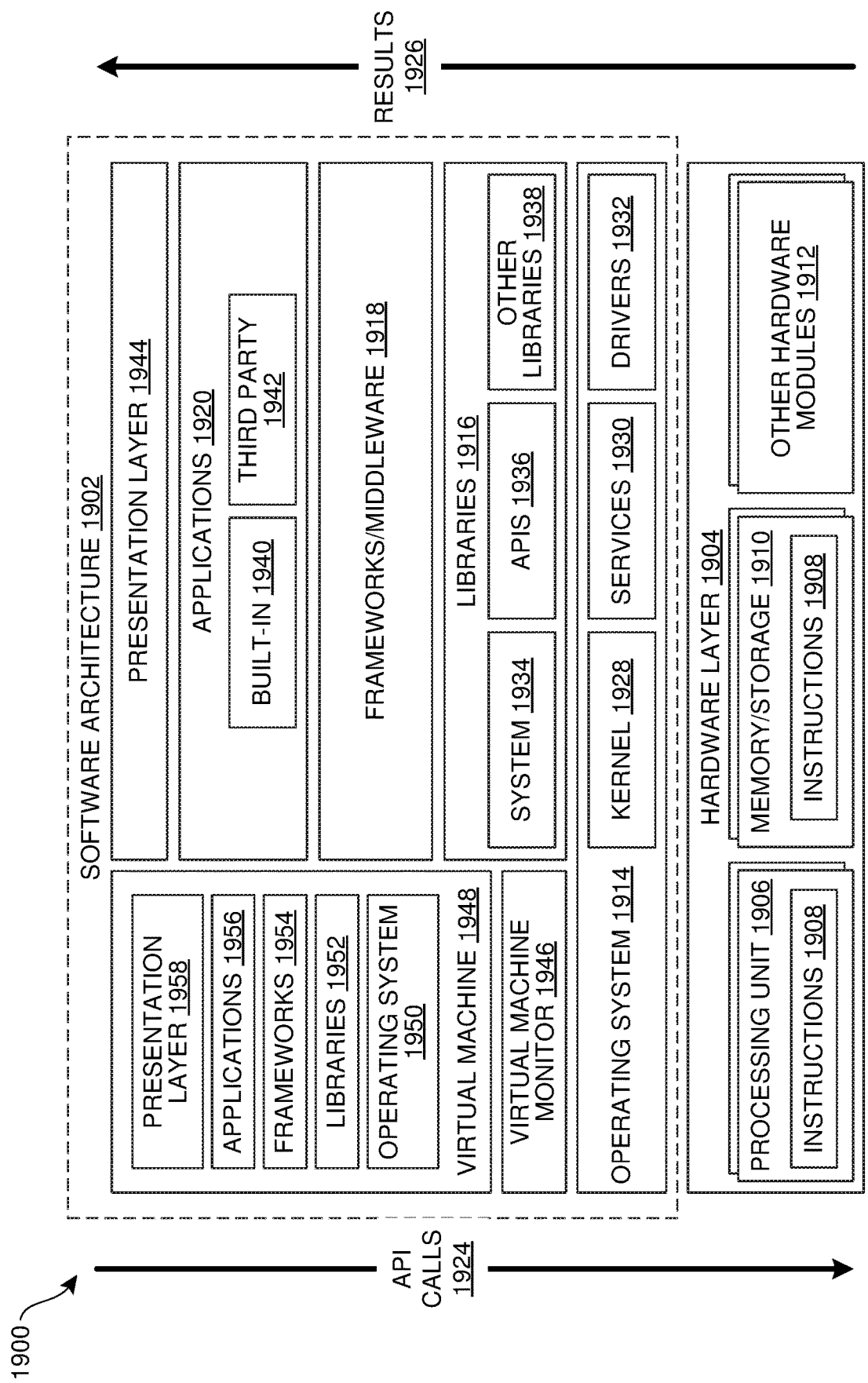
FIG. 19 is a block diagram of an example computing device, which may be used to provide implementations of the mechanisms described herein.

FIG. 19 is a block diagram 1900 illustrating an example software architecture 1902, various portions of which may be used in conjunction with various hardware architectures herein described, which may implement any of the above-described features. FIG. 19 is a non-limiting example of a software architecture and it will be appreciated that many other architectures may be implemented to facilitate the functionality described herein. The software architecture 1902 may execute on hardware that includes, among other things, document storage 1070, processors, memory, and input/output (I/O) components. A representative hardware layer 1904 is illustrated and can represent, for example, the device 190 of FIG. 1. The representative hardware layer 1904 includes a processing unit 1906 and associated executable instructions 1908. The executable instructions 1908 represent executable instructions of the software architecture 1902, including implementation of the methods, modules and so forth described herein. The hardware layer 1904 also includes a memory/storage 1910, which also includes the executable instructions 1908 and accompanying data. The hardware layer 1904 may also include other hardware modules 1912. Instructions 1908 held by processing unit 1908 may be portions of instructions 1908 held by the memory/storage 1910.

The example software architecture 1902 may be conceptualized as layers, each providing various functionality. For example, the software architecture 1902 may include layers and components such as an operating system (OS) 1914, libraries 1916, frameworks 1918, applications 1920, and a presentation layer 1944. Operationally, the applications 1920 and/or other components within the layers may invoke API calls 1924 to other layers and receive corresponding results 1926. The layers illustrated are representative in nature and other software architectures may include additional or different layers. For example, some mobile or special purpose operating systems may not provide the frameworks/middleware 1918.

The OS 1914 may manage hardware resources and provide common services. The OS 1914 may include, for example, a kernel 1928, services 1930, and drivers 1932. The kernel 1928 may act as an abstraction layer between the hardware layer 1904 and other software layers. For example, the kernel 1928 may be responsible for memory management, processor management (for example, scheduling), component management, networking, security settings, and so on. The services 1930 may provide other common services for the other software layers. The drivers 1932 may be responsible for controlling or interfacing with the underlying hardware layer 1904. For instance, the drivers 1932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1916 may provide a common infrastructure that may be used by the applications 1920 and/or other components and/or layers. The libraries 1916 typically provide functionality for use by other software modules to perform tasks, rather than rather than interacting directly with the OS 1914. The libraries 1916 may include system libraries 1934 (for example, C standard library) that may provide functions such as memory allocation, string manipulation, file operations. In addition, the libraries 1916 may include API libraries 1936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1916 may also include a wide variety of other libraries 1938 to provide many functions for applications 1920 and other software modules.

The frameworks 1918 (also sometimes referred to as middleware) provide a higher-level common infrastructure that may be used by the applications 1920 and/or other software modules. For example, the frameworks 1918 may provide various graphic user interface (GUI) functions, high-level resource management, or high-level location services. The frameworks 1918 may provide a broad spectrum of other APIs for applications 1920 and/or other software modules.

The applications 1920 include built-in applications 1940 and/or third-party applications 1942. Examples of built-in applications 1940 may include, but are not limited to, a contacts application, a browser application, a location application, a media application, a messaging application, and/or a game application. Third-party applications 1942 may include any applications developed by an entity other than the vendor of the particular platform. The applications 1920 may use functions available via OS 1914, libraries 1916, frameworks 1918, and presentation layer 1944 to create user interfaces to interact with users.

Some software architectures use virtual machines, as illustrated by a virtual machine 1948. The virtual machine 1948 provides an execution environment where applications/modules can execute as if they were executing on a hardware machine (such as the machine 1000 of FIG. 10, for example). The virtual machine 1948 may be hosted by a host OS (for example, OS 1914) or hypervisor, and may have a virtual machine monitor 1946 which manages operation of the virtual machine 1948 and interoperation with the host operating system. A software architecture, which may be different from software architecture 1902 outside of the virtual machine, executes within the virtual machine 1948 such as an OS 1950, libraries 1952, frameworks 1954, applications 1956, and/or a presentation layer 1958.

Figure 20:
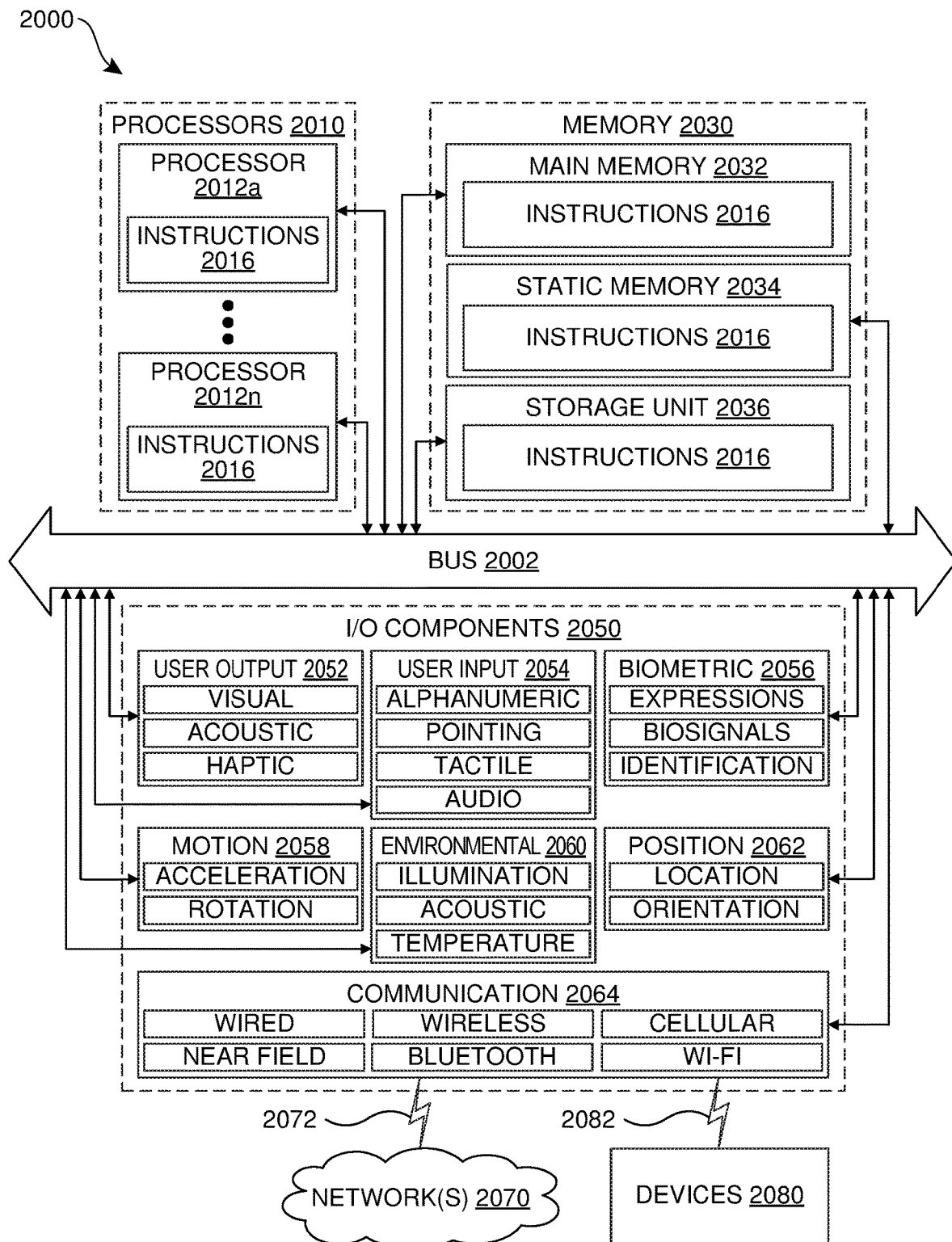
FIG. 20 is a block diagram illustrating components of an example machine configured to read instructions from a machine-readable medium.

FIG. 20 is a block diagram illustrating components of an example machine 2000 configured to read instructions from a machine-readable medium (for example, a machine-readable storage medium) and perform any of the features described herein. The example machine 2000 is in a form of a computer system, within which instructions 2016 (for example, in the form of software components) for causing the machine 2000 to perform any of the features described herein may be executed. As such, the instructions 2016 may be used to implement modules or components described herein. The instructions 2016 cause unprogrammed and/or unconfigured machine 2000 to operate as a particular machine configured to carry out the described features. The machine 2000 may be configured to operate as a standalone device or may be coupled (for example, networked) to other machines. In a networked deployment, the machine 2000 may operate in the capacity of a server machine or a client machine in a server-client network environment, or as a node in a peer-to-peer or distributed network environment. Machine 2000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 2000 is illustrated, the term "machine" includes a collection of machines that individually or jointly execute the instructions 2016.

The machine 2000 may include processors 2010, memory 2030, and I/O components 2050, which may be communicatively coupled via, for example, a bus 2002. The bus 2002 may include multiple buses coupling various elements of machine 2000 via various bus technologies and protocols. In an example, the processors 2010 (including, for example, a central processing unit (CPU), a graphics processing unit (GPU), a digital signal processor (DSP), an ASIC, or a suitable combination thereof) may include one or more processors 2012a to 2012n that may execute the instructions 2016 and process data. In some examples, one or more processors 2010 may execute instructions provided or identified by one or more other processors 2010. The term "processor" includes a multi-core processor including cores that may execute instructions contemporaneously. Although FIG. 20 shows multiple processors, the machine 2000 may include a single processor with a single core, a single processor with multiple cores (for example, a multi-core processor), multiple processors each with a single core, multiple processors each with multiple cores, or any combination thereof. In some examples, the machine 2000 may include multiple processors distributed among multiple machines.

The memory/storage 2030 may include a main memory 2032, a static memory 2034, or other memory, and a storage unit 2036, both accessible to the processors 2010 such as via the bus 2002. The storage unit 2036 and memory 2032, 2034 store instructions 2016 embodying any one or more of the functions described herein. The memory/storage 2030 may also store temporary, intermediate, and/or long-term data for processors 2010. The instructions 2016 may also reside, completely or partially, within the memory 2032, 2034, within the storage unit 2036, within at least one of the processors 2010 (for example, within a command buffer or cache memory), within memory at least one of I/O components 2050, or any suitable combination thereof, during execution thereof. Accordingly, the memory 2032, 2034, the storage unit 2036, memory in processors 2010, and memory in I/O components 2050 are examples of machine-readable media.

As used herein, "machine-readable medium" refers to a device able to temporarily or permanently store instructions and data that cause machine 2000 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 2016) for execution by a machine 2000 such that the instructions, when executed by one or more processors 2010 of the machine 2000, cause the machine 2000 to perform and one or more of the features described herein. Accordingly, a "machine-readable medium" may refer to a single storage device, as well as "cloud-based" storage systems or storage networks that include multiple storage apparatus or devices.

The I/O components 2050 may include a wide variety of hardware components adapted to receive input, provide output, produce output, transmit information, exchange information, capture measurements, and so on. The specific I/O components 2050 included in a particular machine will depend on the type and/or function of the machine. For example, mobile devices such as mobile phones may include a touch input device, whereas a headless server or IoT device may not include such a touch input device. The particular examples of I/O components illustrated in FIG. 20 are in no way limiting, and other types of components may be included in machine 2000. The grouping of I/O components 2050 are merely for simplifying this discussion, and the grouping is in no way limiting. In various examples, the I/O components 2050 may include user output components 2052 and user input components 2054. User output components 2052 may include, for example, display components for displaying information (for example, a liquid crystal display (LCD) or a projector), acoustic components (for example, speakers), haptic components (for example, a vibratory motor or force-feedback device), and/or other signal generators. User input components 2054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 2050 may include biometric components 2056 and/or position components 2062, among a wide array of other environmental sensor components. The biometric components 2056 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 2062 may include, for example, location sensors (for example, a Global Position System (GPS) receiver), altitude sensors (for example, an air pressure sensor from which altitude may be derived), and/or orientation sensors (for example, magnetometers).

The I/O components 2050 may include communication components 2064, implementing a wide variety of technologies operable to couple the machine 2000 to network(s) 2070 and/or device(s) 2080 via respective communicative couplings 2072 and 2082. The communication components 2064 may include one or more network interface components or other suitable devices to interface with the network(s) 2070. The communication components 2064 may include, for example, components adapted to provide wired communication, wireless communication, cellular communication, Near Field Communication (NFC), Bluetooth communication, Wi-Fi, and/or communication via other modalities. The device(s) 2080 may include other machines or various peripheral devices (for example, coupled via USB).

In some examples, the communication components 2064 may detect identifiers or include components adapted to detect identifiers. For example, the communication components 2064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 2062, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system comprising:
a processor; and
machine-readable media including instructions which, when executed by the processor, cause the processor to:
receive from a device of a first participant of a first meeting session, at a user authentication service, a first user authorization input for providing a temporary session-limited access during the first meeting session to a first data set that the first participant is authorized to access, the temporary session-limited access authorizing access to the first data set only by one or more second participants of the first meeting session;
receive, at the user authentication service, a first credential authenticating an identity of the first participant;
receive, at the user authentication service, a first notification that the first participant is actively participating in the first meeting session;
enable, in response to receiving the first notification and a receipt of the first credential, the temporary session-limited access to the first data set limited to a duration of the first meeting session;
receive, during the duration of the first meeting session and after the first notification, a first spoken command from a respective participant among the second participants of the first meeting session requesting rendering of a first electronic content item included in the first data set;
determine that the respective participant is permitted to access the first content item based on the temporary session-limited access;
render the first electronic content item to the respective participant among the one or more second participants in response to the first spoken command and a determination that the temporary session-limited access to the first data set remains enabled;
determine, during the first meeting session, that the first participant is no longer actively participating in the first meeting session by monitoring an input action at the device of the first participant; and
disable the temporary session-limited access to the first data set for the one or more second participants in response to the determination that the first participant is no longer actively participating in the first meeting session.

2. The system of claim 1, wherein a virtual assistant service receives and interprets the first spoken command.

3. The system of claim 1, wherein the instructions further cause the processor to:
receive from a third participant of the first meeting session, at the user authentication service, a second user authorization input for providing a temporary session-limited access during the first meeting session to a second data set that the third participant is authorized to access, wherein the third participant is different than the first participant;
receive from the third participant, at the user authentication service, a second credential authenticating an identity of the third participant;
receive, at the user authentication service, a second notification that the third participant is actively participating in the first meeting session;
enable, in response to receiving the second notification and a receipt of the second credential, the temporary session-limited access to the second data set limited to the duration of the first meeting session;
receive, during the duration of the first meeting session and after the second notification, a second spoken command from a fourth participant of the first meeting session requesting rendering of a second electronic content item included in the second data set; and
render the second electronic content item to the fourth participant in response to the second spoken command and a determination that the temporary session-limited access to the second data set remains enabled.

4. The system of claim 3, wherein the instructions further cause the processor to:
receive, during the duration of the first meeting session, a third spoken command from the first participant requesting rendering of a third electronic content item included in the second data set; and render the third electronic content item to the first participant in response to the third spoken command and a determination that the temporary session-limited access to the second data set remains enabled.

5. The system of claim 3, wherein the instructions further cause the processor to:
receive, during the duration of the first meeting session, a third spoken command from the third participant requesting rendering of a third electronic content item stored in the first data set; and
render the third electronic content item to the third participant in response to the third spoken command and a determination that the temporary session-limited access to the first data set remains enabled.

6. The system of claim 1, wherein the instructions further cause the processor to cause a first computing device associated with the first participant to display a first user interface including a first selectable option for indicating prior to the first meeting session which data set will correspond to the first data set.

7. The system of claim 1, wherein the instructions further cause the processor to cause a first computing device associated with the first participant to display a first user interface including a first selectable option for designating a type of access for the temporary session-limited access that will be enabled during the first meeting session, the type of access being one of a read access, write access, and read and write access.

8. The system of claim 1, wherein the instructions further cause the processor to:
cause a first computing device associated with a third participant of the first meeting session to display a first user interface including a first selectable option for identifying prior to the first meeting session a third data set proposed for the first data set; and
cause a second computing device associated with the first participant to display a meeting invitation with embedded control signals that, when executed by the second computing device, cause the second computing device to display a second user interface including a time of the first meeting session, a second selectable option for indicating accepting or declining the meeting invitation by the first participant, and a third selectable option for indicating whether to accept the proposed third data set as the first data set.

9. The system of claim 1, wherein the input action comprises an activity of a touch screen of the first participant.

10. A method comprising:
receiving from a device of a first participant of a first meeting session, at a user authentication service, a first user authorization input for providing a temporary session-limited access during the first meeting session to a first data set that the first participant is authorized to access at the user authentication service, the temporary session-limited access authorizing access to the first data set only by one or more second participants of the first meeting session;
receiving, at the user authentication service, a first notification that the first participant is actively participating in the first meeting session;
enabling, in response to receiving the first notification and a receipt of the first credential, the temporary session-limited access to the first data set limited to a duration of the first meeting session;
receiving, during the duration of the first meeting session and after the first notification, a first spoken command by a respective participant among the second participants of the first meeting session requesting rendering of a first electronic content item included in the first data set;
determining that the respective participant is permitted to access the first content item based on the temporary session-limited access;
rendering the first electronic content item to the respective participant among the one or more second participants in response to the first spoken command and a determination that the temporary session-limited access to the first data set remains enabled;
determining, during the first meeting session, that the first participant is no longer actively participating in the first meeting session by monitoring an input action at the device of the first participant; and
disabling the temporary session-limited access to the first data set for the one or more second participants in response to the determination that the first participant is no longer actively participating in the first meeting session.

11. The method of claim 10, wherein a virtual assistant service receives and interprets the first spoken command.

12. The method of claim 10, further comprising:
receiving from a third participant of the first meeting session, at the user authentication service, a second user authorization input for providing a temporary session-limited access during the first meeting session to a second data set that the third participant is authorized to access, wherein the third participant is different than the first participant;
receiving from the third participant, at the user authentication service, a second credential authenticating an identity of the third participant;
receiving, at the user authentication service, a second notification that the third participant is actively participating in the first meeting session;
enabling, in response to receiving the second notification and a receipt of the second credential, the temporary session-limited access to the second data set limited to the duration of the first meeting session;
receiving, during the duration of the first meeting session and after the second notification, a second spoken command from a fourth participant of the first meeting session requesting rendering of a second electronic content item included in the second data set; and
rendering the second electronic content item to the fourth participant in response to the second spoken command and a determination that the temporary session-limited access to the second data set remains enabled.

13. The method of claim 12, further comprising:
receiving, during the duration of the first meeting session, a third spoken command from the first participant requesting rendering of a third electronic content item included in the second data set; and
rendering the third electronic content item to the first participant in response to the third spoken command and a determination that the temporary session-limited access to the second data set remains enabled.

14. The method of claim 12, further comprising:
receiving, during the duration of the first meeting session, a third spoken command from the third participant requesting rendering of a third electronic content item stored in the first data set; and
rendering the third electronic content item to the third participant in response to the third spoken command and a determination that the temporary session-limited access to the first data set remains enabled.

15. The method of claim 10, further comprising:

causing a first computing device associated with a third participant of the first meeting session to display a first user interface including a first selectable option for identifying prior to the first meeting session a third data set proposed for the first data set; and causing a second computing device associated with the first participant to display a meeting invitation with embedded control signals that, when executed by the second computing device, cause the second computing device to display a second user interface including a time of the first meeting session, a second selectable option for indicating accepting or declining the meeting invitation by the first participant, and a third selectable option for indicating whether to accept the proposed third data set as the first data set.

16. The method of claim 10, further comprising causing a first computing device associated with the first participant to display a first user interface including a first selectable option for indicating prior to the first meeting session which data set will correspond to the first data set.

17. The method of claim 10, further comprising causing a first computing device associated with the first participant to display a first user interface including a first selectable option for designating a type of access for the temporary session-limited access that will be enabled during the first meeting session, the type of access being one of a read access, write access, and read and write access.

18. The method of claim 10, wherein the input action comprises an activity of a touch screen of the first participant.

19. Machine-readable media including instructions which, when executed by one or more processors, cause the processors to perform the method of claim 10.

20. A non-tangible computer-readable medium on which are stored instructions that, when executed, cause a processor of a programmable device to perform operations of:

receiving from a device of a first participant of a first meeting session, at a user authentication service, a first user authorization input for providing a temporary session-limited access during the first meeting session to a first data set that the first participant is authorized to access, the temporary session-limited access authorizing access to the first data set by one or more second participants of the first meeting session;

receiving, at the user authentication service, a first credential authenticating an identity of the first participant;

receiving, at the user authentication service, a first notification that the first participant is actively participating in the first meeting session;

enabling, in response to receiving the first notification and a receipt of the first credential, the temporary session-limited access to the first data set limited to a duration of the first meeting session;

receiving, during the duration of the first meeting session and after the first notification, a first spoken command from a respective participant among the second participants of the first meeting session requesting rendering of a first electronic content item included in the first data set;

determining that the respective participant is permitted to access the first content item based on the temporary session-limited access;

rendering the first electronic content item to the respective participant among the one or more second participants in response to the first spoken command and a determination that the temporary session-limited access to the first data set remains enabled;

determining, during the first meeting session, that the first participant is no longer actively participating in the first meeting session by monitoring an input action at the device of the first participant; and disabling the temporary session-limited access to the first data set for the one or more second participants in response to the determination that the first participant is no longer actively participating in the first meeting session.

* * * * *